(12) United States Patent
Dai et al.

(10) Patent No.: US 11,719,918 B2
(45) Date of Patent: Aug. 8, 2023

(54) ZOOM LENS ASSEMBLY

(71) Applicant: Zhejiang Sunny Optics Co., Ltd., Yuyao (CN)

(72) Inventors: Fujian Dai, Yuyao (CN); Wuchao Xu, Yuyao (CN); Qi Wu, Yuyao (CN); Liefeng Zhao, Yuyao (CN)

(73) Assignee: Zhejiang Sunny Optics Co., Ltd., Yuyao (CN)

( * ) Notice: Subject to any disclaimer, the term of this patent is extended or adjusted under 35 U.S.C. 154(b) by 21 days.

(21) Appl. No.: 17/375,893

(22) Filed: Jul. 14, 2021

(65) Prior Publication Data
US 2022/0026690 A1 Jan. 27, 2022

(30) Foreign Application Priority Data
Jul. 27, 2020 (CN) .......................... 202010731866.5

(51) Int. Cl.
*G02B 15/14* (2006.01)
(52) U.S. Cl.
CPC .... *G02B 15/144113* (2019.08); *G02B 15/144* (2019.08); *G02B 15/1441* (2019.08); *G02B 15/144105* (2019.08)
(58) Field of Classification Search
CPC .......... G02B 15/144113; G02B 15/144; G02B 15/1441; G02B 15/144105; G02B 15/144101; G02B 15/144109; G02B 15/1445; G02B 15/144501; G02B 15/144505; G02B 15/144509; G02B 15/144513
USPC .................................................. 359/686, 687
See application file for complete search history.

(56) References Cited

U.S. PATENT DOCUMENTS

| | | | | |
|---|---|---|---|---|
| 4,632,519 A | * | 12/1986 | Takahashi ...... | G02B 15/144113 359/687 |
| 2009/0303596 A1 | * | 12/2009 | Ryu ..................... | G02B 27/646 359/557 |
| 2011/0096408 A1 | * | 4/2011 | Kakimoto .............. | G02B 13/18 359/687 |
| 2012/0105976 A1 | * | 5/2012 | Kim ............... | G02B 15/144113 359/687 |
| 2022/0066127 A1 | * | 3/2022 | Chen .................. | G02B 15/1461 |

* cited by examiner

*Primary Examiner* — George G. King
(74) *Attorney, Agent, or Firm* — Reising Ethington P.C.

(57) ABSTRACT

The present disclosure discloses a zoom lens assembly including, sequentially from an object side to an image side along an optical axis, a first lens group having refractive power; a second lens group having negative refractive power; a third lens group having refractive power; and a fourth lens group having refractive power. The zoom lens assembly may be continuously zoomed by changing positions of the second lens group and the third lens group along the optical axis. A total effective focal length ft of the zoom lens assembly in a telephoto state, and a total effective focal length fw of the zoom lens assembly in a wide-angle state satisfy: 1.3<ft/fw<3.3.

18 Claims, 20 Drawing Sheets

ZOOM LENS ASSEMBLY

CROSS-REFERENCE TO RELATED APPLICATION

This application claims benefit of priority to Chinese Patent Application No. 202010731866.5 filed on Jul. 27, 2020 before the China National Intellectual Property Administration, the entire disclosure of which is incorporated herein by reference in its entity.

TECHNICAL FIELD

The present disclosure relates to the field of optical elements, and specifically, to a zoom lens assembly.

BACKGROUND

With the continuous development of science and technology, the camera lens assembly of mobile devices, such as mobile phones, has also been rapidly improved. The market has higher and higher requirements on the camera level and camera quality of the lens assembly of mobile devices, such as mobile phones. At present, the lens assembly of mobile phone mainly achieves the zoom function through the combination of "wide-angle lens assembly, standard lens assembly, and telephoto lens assembly". However, this method needs to switch the lens assembly, resulting in incontiguous zoom. In addition, the switching of the lens assembly will make the white balance unstable. During the switching, the performance of the lens assembly will also suffer a great loss, resulting in poor user performance.

SUMMARY

In one aspect, the present disclosure provides a zoom lens assembly which includes, sequentially from an object side to an image side along an optical axis, a first lens group having refractive power; a second lens group having negative refractive power; a third lens group having refractive power; and a fourth lens group having refractive power. By changing positions of the second lens group and the third lens group along the optical axis, the zoom lens assembly may be continuously zoomed. A total effective focal length ft of the zoom lens assembly in a telephoto state, and a total effective focal length fw of the zoom lens assembly in a wide-angle state may satisfy: $1.3 < ft/fw < 3.3$.

In one embodiment, at least one of an object-side surface of the first lens to an image-side surface of the eighth lens is aspheric.

In one embodiment, an effective focal length F2 of the second lens group, and an effective focal length F3 of the third lens group may satisfy: $-1.5 < F2/F3 < 0$.

In one embodiment, the total effective focal length fw of the zoom lens assembly in the wide-angle state, and an effective focal length F1 of the first lens group may satisfy: $0.3 < fw/F1 < 1.3$.

In one embodiment, an effective focal length F4 of the fourth lens group, and the total effective focal length ft of the zoom lens assembly in the telephoto state may satisfy: $0.2 < |F4|/(|F4|+ft) < 1.0$.

In one embodiment, a spaced interval Tt12 along the optical axis between the first lens group and the second lens group of the zoom lens assembly in the telephoto state, and a spaced interval Tw23 along the optical axis between the second lens group and the third lens group of the zoom lens assembly in the wide-angle state may satisfy: $0.5 < Tt12/Tw23 < 1.5$.

In one embodiment, a spaced interval Tt34 along the optical axis between the third lens group and the fourth lens group of the zoom lens assembly in the telephoto state, and a spaced interval Tw34 along the optical axis between the third lens group and the fourth lens group of the zoom lens assembly in the wide-angle state may satisfy: $0.2 < Tw34/Tt34 < 1.0$.

In one embodiment, the first lens group includes a first lens and a second lens sequentially arranged along the optical axis; the second lens group includes a third lens and a fourth lens sequentially arranged along the optical axis; the third lens group includes a fifth lens, a sixth lens, and a seventh lens sequentially arranged along the optical axis; and the fourth lens group includes an eighth lens.

In one embodiment, an effective focal length f1 of the first lens, an effective focal length f5 of the fifth lens, and an effective focal length f6 of the sixth lens may satisfy: $0.2 < (f6-f5)/f1 < 1.0$.

In one embodiment, a radius of curvature R1 of an object-side surface of the first lens, a radius of curvature R2 of an image-side surface of the first lens, a radius of curvature R3 of an object-side surface of the second lens, and a radius of curvature R4 of an image-side surface of the second lens may satisfy: $0.2 < (R1+R2)/(R3-R4) < 1.0$.

In one embodiment, a radius of curvature R7 of an object-side surface of the fourth lens, a radius of curvature R8 of an image-side surface of the fourth lens, a radius of curvature R9 of an object-side surface of the fifth lens, and a radius of curvature R10 of an image-side surface of the fifth lens may satisfy: $0.3 < (R7+R8)/(R9-R10) < 1.3$.

In one embodiment, a center thickness CT2 of the second lens along the optical axis, a center thickness CT5 of the fifth lens along the optical axis, and a sum of center thicknesses/CT of the first lens to the eighth lens along the optical axis may satisfy: $0.3 < (CT2+CT5)/\Sigma CT < 0.8$.

In one embodiment, a distance TTL along the optical axis from an object-side surface of the first lens to an imaging plane of the zoom lens assembly, and the total effective focal length fw of the zoom lens assembly in the wide-angle state may satisfy: $2.0 < TTL/fw < 3.5$.

In one embodiment, a distance TTL along the optical axis from an object-side surface of the first lens to an imaging plane of the zoom lens assembly, and the total effective focal length ft of the zoom lens assembly in the telephoto state may satisfy: $0.8 < TTL/ft < 1.8$.

In another aspect, the present disclosure provides a zoom lens assembly which includes, sequentially from an object side to an image side along an optical axis, a first lens group having refractive power which includes a first lens and a second lens sequentially arranged along the optical axis; a second lens group having negative refractive power which includes a third lens and a fourth lens sequentially arranged along the optical axis; a third lens group having refractive power which includes a fifth lens, a sixth lens, and a seventh lens sequentially arranged along the optical axis; and a fourth lens group having refractive power which includes an eighth lens. By changing positions of the second lens group and the third lens group along the optical axis, the zoom lens assembly may be continuously zoomed.

In one embodiment, an effective focal length F2 of the second lens group, and an effective focal length F3 of the third lens group may satisfy: $-1.5 < F2/F3 < 0$.

In one embodiment, a total effective focal length fw of the zoom lens assembly in a wide-angle state, and an effective focal length F1 of the first lens group may satisfy: $0.3<fw/F1<1.3$.

In one embodiment, an effective focal length F4 of the fourth lens group, and a total effective focal length ft of the zoom lens assembly in a telephoto state may satisfy: $0.2<|F4|/(|F4|+ft)<1.0$.

In one embodiment, a spaced interval Tt12 along the optical axis between the first lens group and the second lens group of the zoom lens assembly in a telephoto state, and a spaced interval Tw23 along the optical axis between the second lens group and the third lens group of the zoom lens assembly in a wide-angle state may satisfy: $0.5<Tt12/Tw23<1.5$.

In one embodiment, a spaced interval Tt34 along the optical axis between the third lens group and the fourth lens group of the zoom lens assembly in a telephoto state, and a spaced interval Tw34 along the optical axis between the third lens group and the fourth lens group of the zoom lens assembly in a wide-angle state may satisfy: $0.2<Tw34/Tt34<1.0$.

In one embodiment, an effective focal length f1 of the first lens, an effective focal length f5 of the fifth lens, and an effective focal length f6 of the sixth lens may satisfy: $0.2<(f6-f5)/f1<1.0$.

In one embodiment, a radius of curvature R1 of an object-side surface of the first lens, a radius of curvature R2 of an image-side surface of the first lens, a radius of curvature R3 of an object-side surface of the second lens, and a radius of curvature R4 of an image-side surface of the second lens may satisfy: $0.2<(R1+R2)/(R3-R4)<1.0$.

In one embodiment, a radius of curvature R7 of an object-side surface of the fourth lens, a radius of curvature R8 of an image-side surface of the fourth lens, a radius of curvature R9 of an object-side surface of the fifth lens, and a radius of curvature R10 of an image-side surface of the fifth lens may satisfy: $0.3<(R7+R8)/(R9-R10)<1.3$.

In one embodiment, a center thickness CT2 of the second lens along the optical axis, a center thickness CT5 of the fifth lens along the optical axis, and a sum of center thicknesses/CT of the first lens to the eighth lens along the optical axis may satisfy: $0.3<(CT2+CT5)/\Sigma CT<0.8$.

In one embodiment, a distance TTL along the optical axis from an object-side surface of the first lens to an imaging plane of the zoom lens assembly, and a total effective focal length fw of the zoom lens assembly in a wide-angle state may satisfy: $2.0<TTL/fw<3.5$.

In one embodiment, a distance TTL along the optical axis from an object-side surface of the first lens to an imaging plane of the zoom lens assembly, and a total effective focal length ft of the zoom lens assembly in a telephoto state may satisfy: $0.8<TTL/ft<1.8$.

In one embodiment, a total effective focal length ft of the zoom lens assembly in a telephoto state, and a total effective focal length fw of the zoom lens assembly in a wide-angle state may satisfy: $1.3<ft/fw<3.3$.

The present disclosure provides a zoom lens assembly having continuous zoom, smooth image transition during zooming, miniaturization, and good image quality by reasonably assigning refractive power and optimizing optical parameters.

BRIEF DESCRIPTION OF THE DRAWINGS

Other features, objects, and advantages of the present disclosure will become more apparent by reading the detailed description of the non-limiting examples with reference to the accompanying drawings.

DETAILED DESCRIPTION OF EMBODIMENTS

Figure 1:
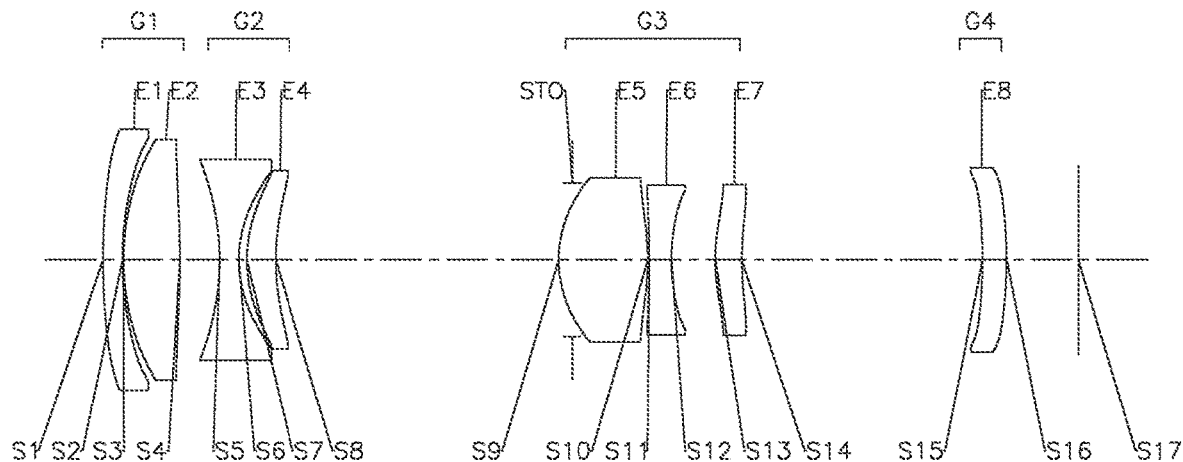
FIG. 1 shows a schematic structural view of a zoom lens assembly in a wide-angle state according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is convex and the position of the convex is not defined, it indicates that the surface of the lens is convex at least in the paraxial region; and if a surface of a lens is concave and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

A zoom lens assembly according to an exemplary embodiment of the present disclosure may include four lens groups having refractive power, which are a first lens group, a second lens group, a third lens group, and a fourth lens group. The four lens groups are arranged sequentially from an object side to an image side along an optical axis. By changing positions of the second lens group and the third lens group along the optical axis, the zoom lens assembly may be continuously zoomed.

The zoom lens assembly according to an exemplary embodiment of the present disclosure may include eight lenses having refractive power, which are a first lens, a second lens, a third lens, a fourth lens, a fifth lens, a sixth lens, a seventh lens, and an eighth lens. The eight lenses are arranged sequentially from an object side to an image side along an optical axis. The first lens and the second lens may constitute the first lens group; the third lens and the fourth lens may constitute the second lens group; the fifth lens, the sixth lens, and the seventh lens may constitute the third lens group; and the eighth lens may constitute the fourth lens group.

In the exemplary embodiment, the first lens group may have positive or negative refractive power; the second lens group may have negative refractive power; the third lens group may have positive or negative refractive power; and the fourth lens group may have positive or negative refractive power.

In the exemplary embodiment, by reasonably distributing the number of lenses and the refractive power of each lens group, the function of optical continuous zoom may be achieved on the premise of ensuring that the main technical parameters of the system meet certain specifications. By reasonably assigning the refractive power of each lens group and the refractive power of each lens in each lens group, and reasonably controlling the spaced interval of each lens group, the whole system may achieve the continuous zoom function by changing the spaced interval between each lens group during operation.

In the exemplary embodiment, the zoom lens assembly according to the present disclosure may satisfy: $1.3<ft/fw<3.3$, where ft is a total effective focal length of the zoom lens assembly in a telephoto state, and fw is a total effective focal length of the zoom lens assembly in a wide-angle state. More specifically, ft and fw may further satisfy: $1.4<ft/fw<3.1$. Satisfying $1.3<ft/fw<3.3$, and combining the size of the image plane in the telephoto state and the wide-angle state, the continuous zoom range may be effectively controlled, so that the zoom lens assembly has a continuous zoom function within a certain range.

In the exemplary embodiment, the zoom lens assembly according to the present disclosure may satisfy: $-1.5<F2/F3<0$, where F2 is an effective focal length of the second lens group, and F3 is an effective focal length of the third lens group. More specifically, F2 and F3 may further satisfy: $-1.2<F2/F3<-0.7$. Satisfying $-1.5<F2/F3<0$ may reasonably distribute the refractive power of the system, and ensure that the system has the function of continuous zooming.

In the exemplary embodiment, the zoom lens assembly according to the present disclosure may satisfy: $0.3<fw/F1<1.3$, where fw is a total effective focal length of the zoom lens assembly in a wide-angle state, and F1 is an effective focal length of the first lens group. More specifically, fw and F1 may further satisfy: $0.4<fw/F1<0.8$. Satisfying $0.3<fw/F1<1.3$ may effectively reduce the aberration contributed by the first lens group, thereby improving the image quality of the system.

In the exemplary embodiment, the zoom lens assembly according to the present disclosure may satisfy: $0.2<|F4|/(|F4|+ft)<1.0$, where F4 is an effective focal length of the fourth lens group, and ft is a total effective focal length of the zoom lens assembly in a telephoto state. More specifically, F4 and ft may further satisfy: $0.3<|F4|/(|F4|+ft)<1.0$. When $0.2<|F4|/(|F4|+ft)<1.0$ is satisfied, the refractive power of the fourth lens group may be effectively controlled, and the main technical parameters of the system may be ensured while the system has a relatively high image quality.

In the exemplary embodiment, the zoom lens assembly according to the present disclosure may satisfy: $0.5<Tt12/Tw23<1.5$, where Tt12 is a spaced interval along the optical axis between the first lens group and the second lens group of the zoom lens assembly in a telephoto state, and Tw23 is a spaced interval along the optical axis between the second lens group and the third lens group of the zoom lens assembly in a wide-angle state. More specifically, Tt12 and Tw23 may further satisfy: $0.6<Tt12/Tw23<1.2$. Satisfying $0.5<Tt12/Tw23<1.5$ may effectively control the movement range of the second lens group to achieve the continuous zoom function of the system.

In the exemplary embodiment, the zoom lens assembly according to the present disclosure may satisfy: $0.2<Tw34/Tt34<1.0$, where Tt34 is a spaced interval along the optical axis between the third lens group and the fourth lens group of the zoom lens assembly in a telephoto state, and Tw34 is a spaced interval along the optical axis between the third lens group and the fourth lens group of the zoom lens assembly in a wide-angle state. More specifically, Tt34 and Tw34 may further satisfy: $0.3<Tw34/Tt34<0.8$. Satisfying $0.2<Tw34/Tt34<1.0$ may be effectively control the movement range of the third lens group to achieve the continuous zoom function of the system.

In the exemplary embodiment, the zoom lens assembly according to the present disclosure may satisfy: $0.2<(f6-f5)/f1<1.0$, where f1 is an effective focal length of the first lens, f5 is an effective focal length of the fifth lens, and f6 is an effective focal length of the sixth lens. More specifically, f6, f5 and f1 may further satisfy: $0.3<(f6-f5)/f1<0.6$. Satisfying $0.2<(f6-f5)/f1<1.0$ may reasonably distribute the refractive power of the system, ensure that the system has better processability, and ensure that the system has better image quality.

In the exemplary embodiment, the zoom lens assembly according to the present disclosure may satisfy: $0.2<(R1+R2)/(R3-R4)<1.0$, where R1 is a radius of curvature of an object-side surface of the first lens, R2 is a radius of curvature of an image-side surface of the first lens, R3 is a radius of curvature of an object-side surface of the second lens, and R4 is a radius of curvature of an image-side surface of the second lens. More specifically, R1, R2, R3 and R4 may further satisfy: $0.4<(R1+R2)/(R3-R4)<0.9$. Satisfying $0.2<(R1+R2)/(R3-R4)<1.0$ may better control the shape of the first lens and the second lens, reasonably distribute the refractive power of the lenses, improve the workability of the lenses, so that the system has better image quality.

In the exemplary embodiment, the zoom lens assembly according to the present disclosure may satisfy: $0.3<(R7+R8)/(R9-R10)<1.3$, where R7 is a radius of curvature of an object-side surface of the fourth lens, R8 is a radius of curvature of an image-side surface of the fourth lens, R9 is a radius of curvature of an object-side surface of the fifth lens, and R10 is a radius of curvature of an image-side surface of the fifth lens. More specifically, R7, R8, R9 and R10 may further satisfy: $0.4<(R7+R8)/(R9-R10)<1.1$. When $0.3<(R7+R8)/(R9-R10)<1.3$ is satisfied, the shapes of the fourth lens and the fifth lens may be better controlled, so that the sensitivity of the fourth lens and the fifth lens is reduced while satisfying the optical performance, so as to improve the performance of the system.

In the exemplary embodiment, the zoom lens assembly according to the present disclosure may satisfy: $0.3<(CT2+CT5)/\Sigma CT<0.8$, where CT2 is a center thickness of the second lens along the optical axis, CT5 is a center thickness of the fifth lens along the optical axis, and/CT is a sum of center thicknesses of the first lens to the eighth lens along the optical axis. More specifically, CT2, CT5 and/CT may further satisfy: $0.3<(CT2+CT5)/\Sigma CT<0.6$. Satisfying $0.3<(CT2+CT5)/\Sigma CT<0.8$ may be better control the contribution of each lens to field curvature of the system. Through the cooperation between the lenses, the system has a smaller field curvature, thereby improving the image quality of the system.

In the exemplary embodiment, the zoom lens assembly according to the present disclosure may satisfy: $2.0<TTL/fw<3.5$, where TTL is a distance along the optical axis from an object-side surface of the first lens to an imaging plane of the zoom lens assembly, and fw is a total effective focal length of the zoom lens assembly in a wide-angle state. More specifically, TTL and fw may further satisfy: $2.0<TTL/fw<3.3$. Satisfying $2.0<TTL/fw<3.5$ may effectively control the total effective focal length of the system in the wide-angle state in a smaller range, and may effectively ensure that the system has a relatively large continuous zoom range.

In the exemplary embodiment, the zoom lens assembly according to the present disclosure may satisfy: $0.8<TTL/ft<1.8$, where TTL is a distance along the optical axis from an object-side surface of the first lens to an imaging plane of the zoom lens assembly, and ft is a total effective focal length of the zoom lens assembly in a telephoto state. Satisfying $0.8<TTL/ft<1.8$ may effectively control the total effective focal length of the system in the telephoto state in a larger range, and effectively ensure that the system has relatively large continuous zoom range.

In the exemplary embodiment, the zoom lens assembly according to the present disclosure may further include a stop disposed between the second lens group and the third lens group. The present disclosure proposes a zoom lens assembly with the characteristics of continuous zooming, smooth image transition during zooming, miniaturization, and high image quality. The zoom lens assembly according to the above embodiments of the present disclosure may include a plurality of lenses, such as eight lenses as described above. By reasonably configuring the refractive power of each lens, the surface shape, the center thickness of each lens, and spaced intervals along the optical axis between the lenses, the incident light may be effectively converged, the total optical length of the imaging lens assembly may be reduced, and the workability of the imaging lens assembly may be improved, so that the zoom lens assembly is more applicable for production and processing.

In the embodiments of the present disclosure, at least one of the surfaces of lenses is aspheric, that is, at least one of the object-side surface of the first lens to the image-side surface of the eighth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens, the fifth lens, the sixth lens, the seventh lens and the eighth lens is aspheric. Optionally, the object-side surface and the image-side surface of each of the first lens, the second lens, the third lens, the fourth lens, the fifth lens, the sixth lens, the seventh lens and the eighth lens are aspheric. Optionally, the object-side surface and the image-side surface of the first lens are spherical; and the object-side surface and the image-side surface of each of the second lens, the third lens, the fourth lens, the fifth lens, the sixth lens, the seventh lens, and the eighth lens are aspheric.

However, it will be understood by those skilled in the art that the number of lenses constituting the zoom lens assembly may be varied to achieve the various results and advantages described in this specification without departing from the technical solution claimed by the present disclosure. For example, although the embodiment is described by taking eight lenses as an example, the zoom lens assembly is not limited to include eight lenses. The zoom lens assembly may also include other numbers of lenses if desired.

Some specific examples of a zoom lens assembly applicable to the above embodiment will be further described below with reference to the accompanying drawings.

Example 1

Figure 2:
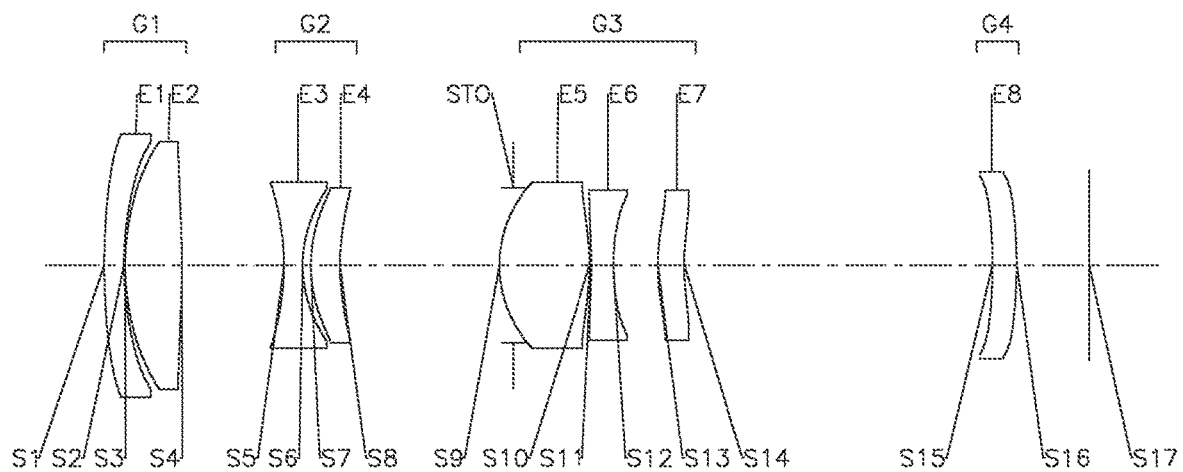
FIG. 2 shows a schematic structural view of a zoom lens assembly in an intermediate state during a transition from a wide-angle state to a telephoto state according to example 1 of the present disclosure.
Figure 3:
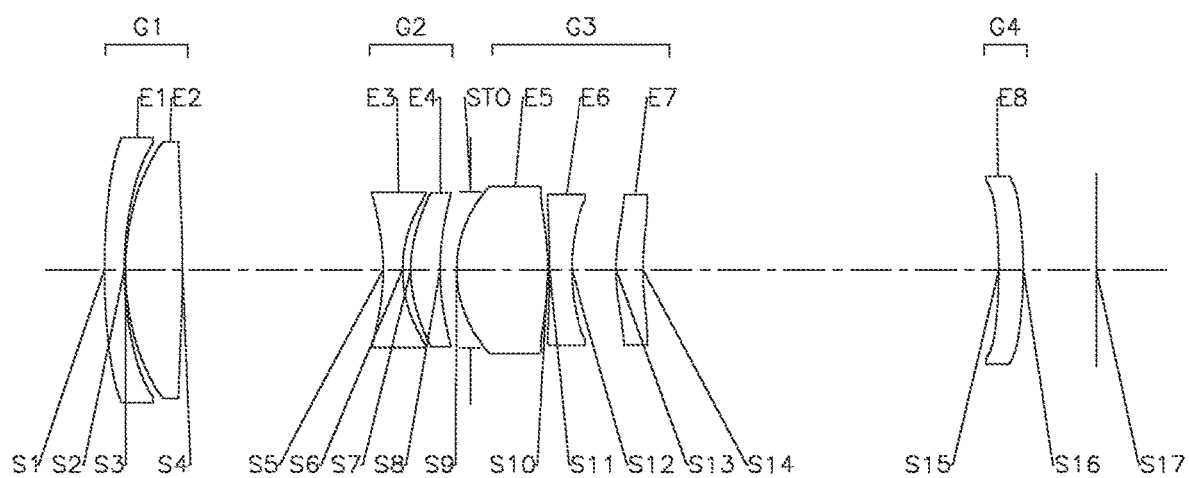
FIG. 3 shows a schematic structural view of a zoom lens assembly in a telephoto state according to example 1 of the present disclosure.

A zoom lens assembly according to example 1 of the present disclosure is described below with reference to FIGS. 1 to 6D. FIG. 1 shows a schematic structure view of a zoom lens assembly in a wide-angle state according to example 1 of the present disclosure. FIG. 2 shows a schematic structural view of a zoom lens assembly in an intermediate state during a transition from a wide-angle state to a telephoto state according to example 1 of the present disclosure. FIG. 3 shows a schematic structural view of a zoom lens assembly in a telephoto state according to example 1 of the present disclosure.

As shown in FIGS. 1 to 3, the zoom lens assembly sequentially from an object side to an imaging side includes a first lens group G1 (a first lens E1, and a second lens E2), a second lens group G2 (a third lens E3, and a fourth lens E4), a stop STO, a third lens group G3 (a fifth lens E5, a sixth lens E6, and a seventh lens E7), a fourth lens group G4 (an eighth lens E8), and an imaging plane S17.

The first lens E1 has negative refractive power, an object-side surface S1 thereof is convex, and an image-side surface S2 thereof is concave. The second lens E2 has positive refractive power, an object-side surface S3 thereof is convex, and an image-side surface S4 thereof is convex. The third lens E3 has negative refractive power, an object-side surface S5 thereof is concave, and an image-side surface S6 thereof is concave. The fourth lens E4 has positive refractive power, an object-side surface S7 thereof is convex, and an image-side surface S8 thereof is concave. The fifth lens E5 has positive refractive power, an object-side surface S9 thereof is convex, and an image-side surface S10 thereof is convex. The sixth lens E6 has negative refractive power, an object-side surface S11 thereof is concave, and an image-side surface S12 thereof is concave. The seventh lens E7 has positive refractive power, an object-side surface S13 thereof is convex, and an image-side surface S14 thereof is concave. The eighth lens E8 has positive refractive power, an object-side surface S15 thereof is concave, and an image-side surface S16 thereof is convex. Light from an object sequentially passes through the respective surfaces S1 to S16 and is finally imaged on the imaging plane S17.

Table 1 is a table illustrating basic parameters of the zoom lens assembly of example 1, wherein the units for the radius of curvature, the thickness/distance and the focal length are millimeter (mm).

TABLE 1

| Surface number | Surface type | Radius of curvature | Thickness/Distance | Material Refractive index | Abbe number | Focal length | Conic coefficient |
|---|---|---|---|---|---|---|---|
| OBJ | Spherical | Infinite | Infinite | | | | |
| S1 | Spherical | 21.2558 | 0.6000 | 1.66 | 20.3 | −32.08 | 0.000 |
| S2 | Spherical | 10.5273 | 0.0350 | | | | 0.000 |
| S3 | Aspheric | 7.9448 | 1.7205 | 1.54 | 55.6 | 12.03 | 0.000 |
| S4 | Aspheric | −32.0324 | D1 | | | | 0.000 |
| S5 | Aspheric | −6.7933 | 0.5843 | 1.54 | 55.6 | −4.53 | 0.000 |
| S6 | Aspheric | 3.9086 | 0.2481 | | | | 0.000 |
| S7 | Aspheric | 4.1948 | 0.8866 | 1.67 | 19.3 | 13.29 | 0.000 |
| S8 | Aspheric | 7.1756 | D2 | | | | 0.000 |
| STO | Spherical | Infinite | −0.4264 | | | | |
| S9 | Aspheric | 3.6505 | 2.7587 | 1.49 | 70.4 | 5.49 | 0.000 |
| S10 | Aspheric | −7.6229 | 0.0511 | | | | 0.000 |
| S11 | Aspheric | −21.7434 | 0.6748 | 1.62 | 24.2 | −7.93 | 0.000 |
| S12 | Aspheric | 6.5319 | 1.3520 | | | | 0.000 |
| S13 | Aspheric | 6.5713 | 0.8111 | 1.67 | 19.3 | 27.56 | 0.000 |
| S14 | Aspheric | 9.6254 | D3 | | | | 0.000 |
| S15 | Aspheric | −12.5672 | 0.7397 | 1.55 | 46.5 | 90.87 | 0.000 |
| S16 | Aspheric | −10.2537 | 2.2000 | | | | 0.000 |
| S17 | Spherical | Infinite | 0.0000 | | | | |

In this example, by changing positions of the second lens group and the third lens group along the optical axis, continuous zooming of the zoom lens assembly may be achieved. In other words, by changing the spaced interval D1 between the first lens group and the second lens group along the optical axis (i.e., a spaced interval between the image-side surface of the second lens E2 and the object-side surface of the third lens E3 along the optical axis), the spaced interval D2 between the second lens group and the third lens group along the optical axis (i.e., a spaced interval between the image-side surface of the fourth lens E4 and the object-side surface of the fifth lens E5 along the optical axis), and the spaced interval D3 between the third lens group and the fourth lens group along the optical axis (i.e., a spaced interval between the image-side surface of the seventh lens E7 and the object-side surface of the eighth lens E8 along the optical axis), the zoom lens assembly is switched from a wide-angle state to a telephoto state or from a telephoto state to a wide-angle state. A total effective focal length f, a maximum field-of-view FOV, and an aperture value Fno of the zoom lens assembly vary as the zoom lens assembly switches from the wide-angle state to the telephoto state or from the telephoto state to the wide-angle state.

Table 2 is a table showing parameters corresponding to the different states of the zoom lens assembly of example 1, wherein units of f, D1, D2 and D3 are all millimeters (mm) and unit of FOV is degrees (°).

TABLE 2

| | f | FOV | Fno | D1 | D2 | D3 |
|---|---|---|---|---|---|---|
| Wide-angle state | 9.20 | 36.4 | 3.23 | 1.2335 | 9.1352 | 7.4165 |
| Intermediate state | 14.98 | 21.6 | 3.70 | 3.1136 | 5.2782 | 9.3935 |
| Telephoto state | 27.50 | 11.7 | 4.03 | 6.0848 | 0.9264 | 10.7741 |

In this example, a total length TTL of the zoom lens assembly (i.e., a distance along the optical axis from the object-side surface S1 of the first lens E1 to the imaging plane S17 of the zoom lens assembly) is 30.02 mm, and half of a diagonal length ImgH of an effective pixel area on the imaging plane S17 of the zoom lens assembly is 2.90 mm.

In Example 1, the object-side surface and the image-side surface of the second lens E2 to the eighth lens E8 are aspherical surfaces, and surface shape x of each aspheric lens may be defined by using, but not limited to, the following aspheric formula:

$$x = \frac{ch^2}{1 + \sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; $A_i$ is a correction coefficient for the i-th order of the aspheric surface. Table 3 below shows high-order coefficients A4, A6, A8, A10, A12, A14 and A16 applicable to each aspheric surface S3 to S16 in example 1.

TABLE 3

| Surface number | A4 | A6 | A8 | A10 | A12 | A14 | A16 |
|---|---|---|---|---|---|---|---|
| S3 | 1.1592E−04 | −9.8634E−06 | 1.9295E−06 | 2.3828E−08 | −1.0623E−09 | 1.7696E−12 | −7.0811E−13 |
| S4 | 9.7852E−05 | −1.4737E−05 | 1.5180E−06 | 1.3827E−07 | −3.5864E−09 | 1.2126E−10 | 3.0652E−12 |
| S5 | 1.8969E−04 | 6.1340E−06 | 4.8272E−07 | −8.0718E−09 | 8.8316E−10 | 0.0000E+00 | 0.0000E+00 |
| S6 | 4.3402E−04 | 1.3046E−05 | 1.4410E−06 | −1.7800E−07 | 2.4977E−09 | 0.0000E+00 | 0.0000E+00 |
| S7 | 4.4172E−03 | −7.1206E−04 | 6.1885E−05 | −2.2063E−06 | 2.2067E−08 | 0.0000E+00 | 0.0000E+00 |
| S8 | −1.1458E−04 | 5.8946E−05 | −8.7564E−05 | 5.2265E−06 | 5.5318E−08 | 0.0000E+00 | 0.0000E+00 |
| S9 | −3.8844E−03 | 2.2023E−04 | −1.9995E−06 | −6.0327E−06 | 1.8547E−07 | 0.0000E+00 | 0.0000E+00 |
| S10 | −1.8084E−03 | −2.1849E−04 | 5.0014E−05 | −8.4814E−07 | −9.7337E−07 | 5.5009E−08 | 0.0000E+00 |
| S11 | −5.8225E−04 | −1.2276E−05 | 2.1877E−06 | −8.2215E−08 | 0.0000E+00 | 0.0000E+00 | 0.0000E+00 |
| S12 | 4.8384E−03 | −6.0466E−05 | 7.0725E−05 | −1.4762E−05 | 7.5122E−07 | 0.0000E+00 | 0.0000E+00 |
| S13 | 8.2281E−04 | 3.1212E−04 | 2.6653E−05 | −6.8419E−06 | 0.0000E+00 | 0.0000E+00 | 0.0000E+00 |
| S14 | 2.6123E−04 | 2.9529E−04 | 6.7008E−06 | 1.1043E−05 | 6.9689E−07 | 0.0000E+00 | 0.0000E+00 |
| S15 | −1.9273E−03 | −8.7326E−04 | −3.9958E−05 | −1.3646E−05 | 8.7264E−06 | −8.5341E−07 | 0.0000E+00 |
| S16 | −1.4030E−03 | −6.6758E−04 | −1.9092E−04 | 5.4074E−05 | −4.0376E−06 | 0.0000E+00 | 0.0000E+00 |

Figure 4A:
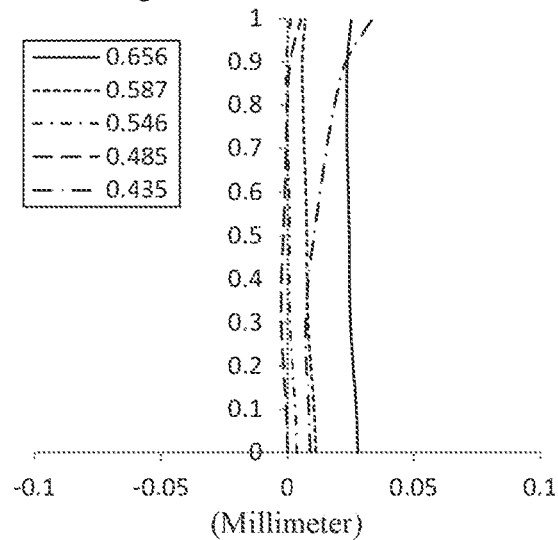
FIGS. 4A to 4D show longitudinal aberration curves, astigmatic curves, a distortion curve, and a lateral color curve, respectively, when the zoom lens assembly of example 1 is in a wide-angle state.
Figure 4B:
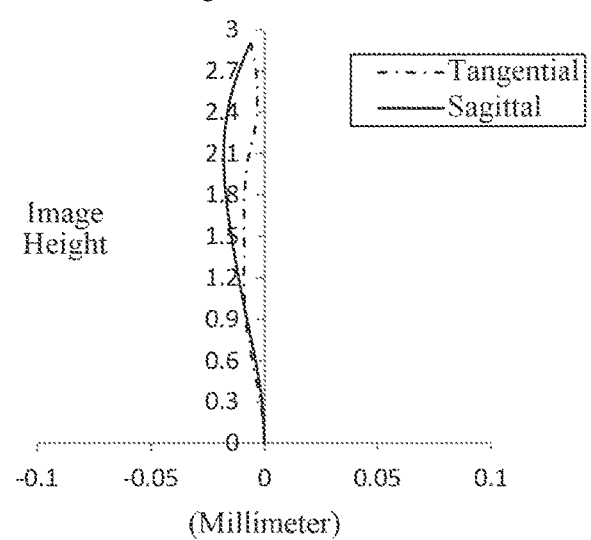
Figure 4C:
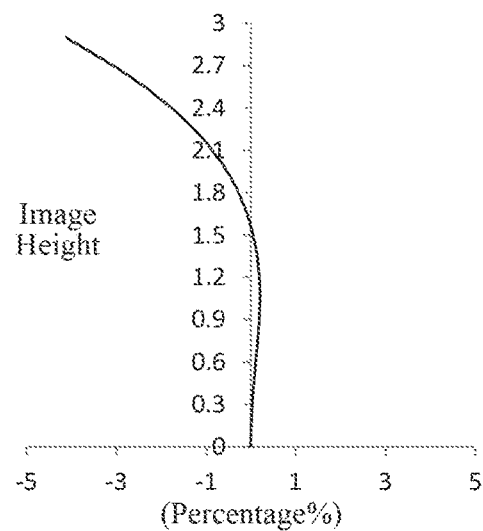
Figure 4D:
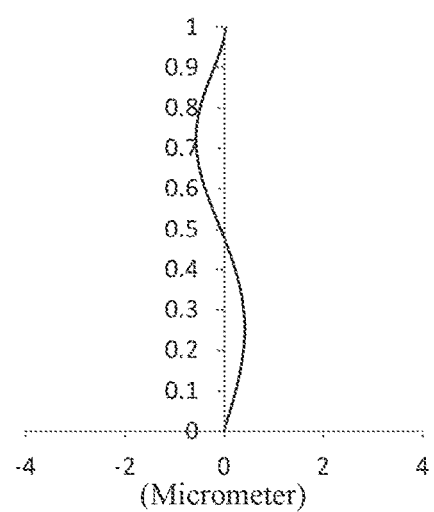
Figure 5A:
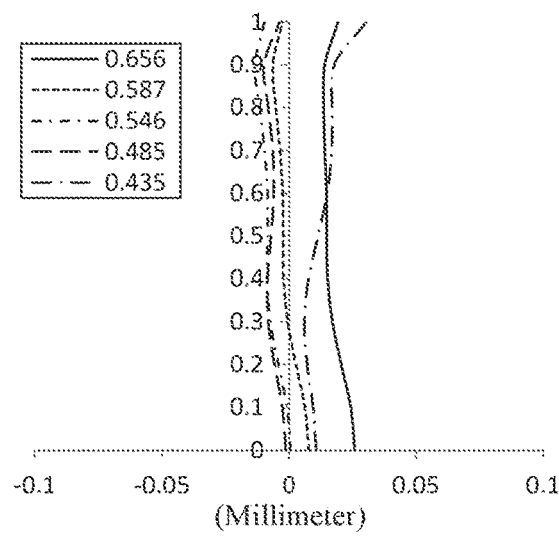
FIGS. 5A to 5D show longitudinal aberration curves, astigmatic curves, a distortion curve, and a lateral color curve, respectively, when the zoom lens assembly of example 1 is in an intermediate state during a transition from a wide-angle state to a telephoto state.
Figure 5B:
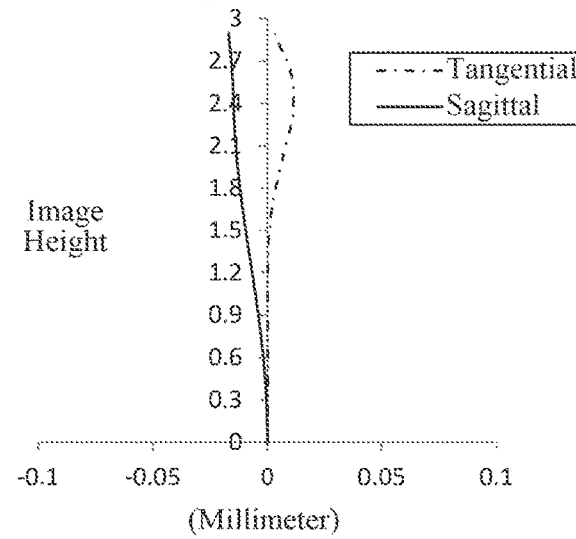
Figure 5C:
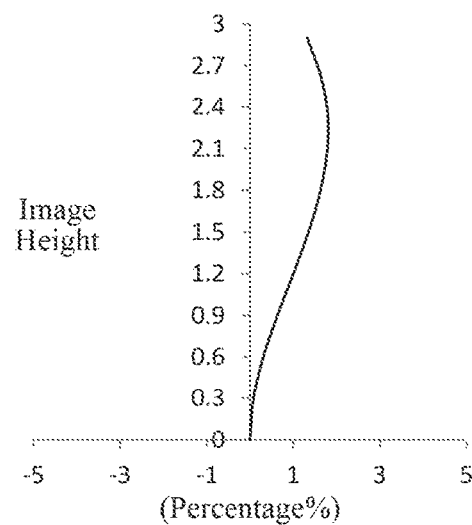
Figure 5D:
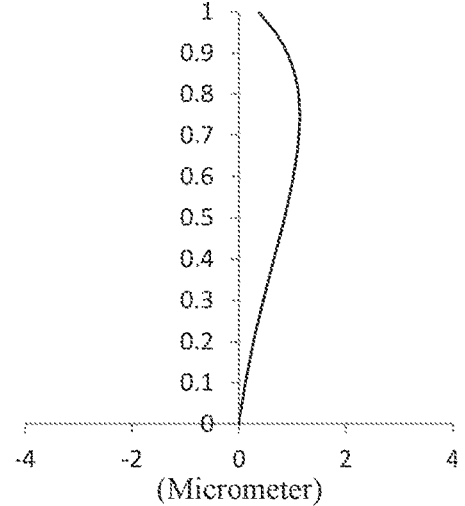
Figure 6A:
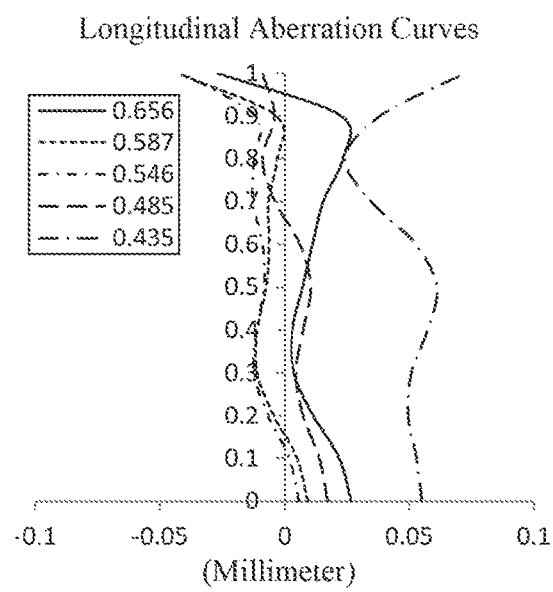
FIGS. 6A to 6D show longitudinal aberration curves, astigmatic curves, a distortion curve, and a lateral color curve, respectively, when the zoom lens assembly of example 1 is in a telephoto state.
Figure 6B:
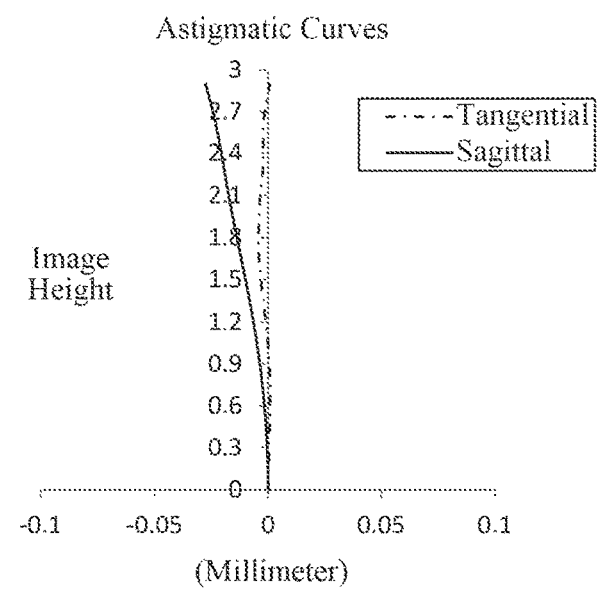
Figure 6C:
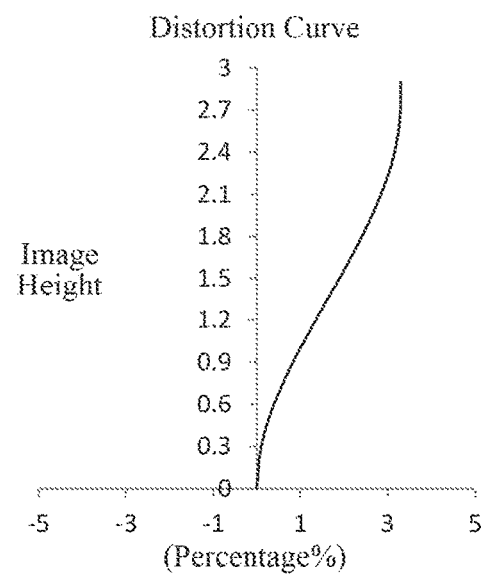
Figure 6D:
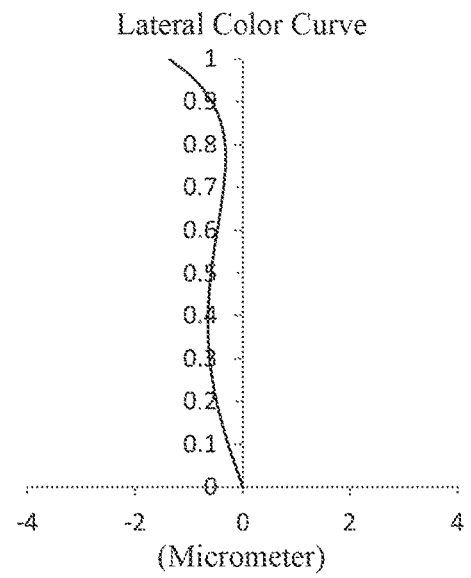

FIGS. 4A, 5A, and 6A show longitudinal aberration curves when the zoom lens assembly of example 1 is in the wide-angle state, the intermediate state, and the telephoto state, respectively, representing the deviations of focal points converged by light of different wavelengths after passing through the lens assembly. FIGS. 4B, 5B, and 6B show astigmatic curves when the zoom lens assembly of example 1 is in the wide-angle state, the intermediate state, and the telephoto state, respectively, representing the curvatures of a tangential plane and the curvatures of a sagittal plane. FIGS. 4C, 5C, and 6C show a distortion curve when the zoom lens assembly of example 1 is in the wide-angle state, the intermediate state, and the telephoto state, respectively, representing the amounts of distortion corresponding to different image heights. FIGS. 4D, 5D, and 6D show a lateral color curve when the zoom lens assembly of example 1 is in the wide-angle state, the intermediate state, and the telephoto state, respectively, representing the deviations of different image heights on an imaging plane after light passes through the lens assembly. As can be seen from FIGS. 4A to 6D, the zoom lens assembly according to example 1 can achieve good imaging quality in each state.

Example 2

Figure 7:
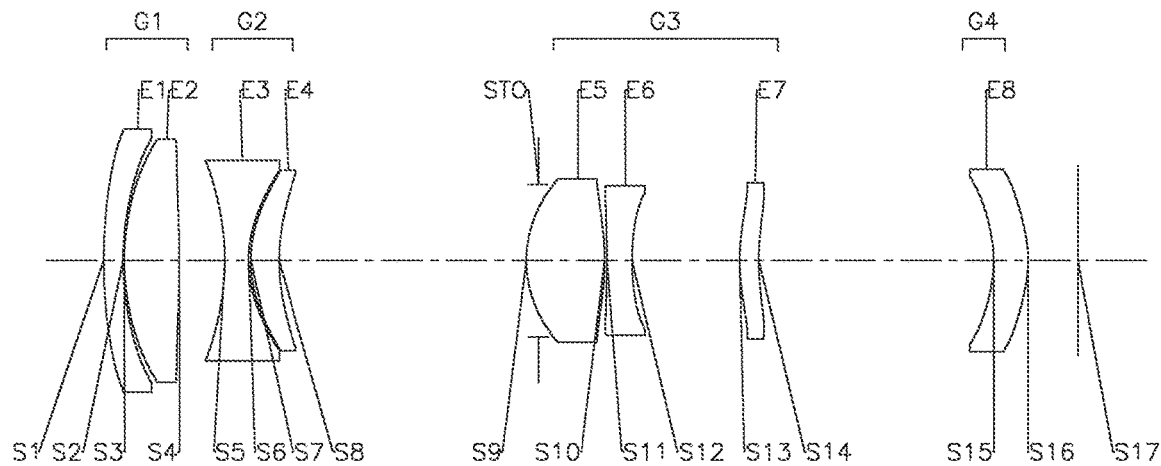
FIG. 7 shows a schematic structural view of a zoom lens assembly in a wide-angle state according to example 2 of the present disclosure.
Figure 8:
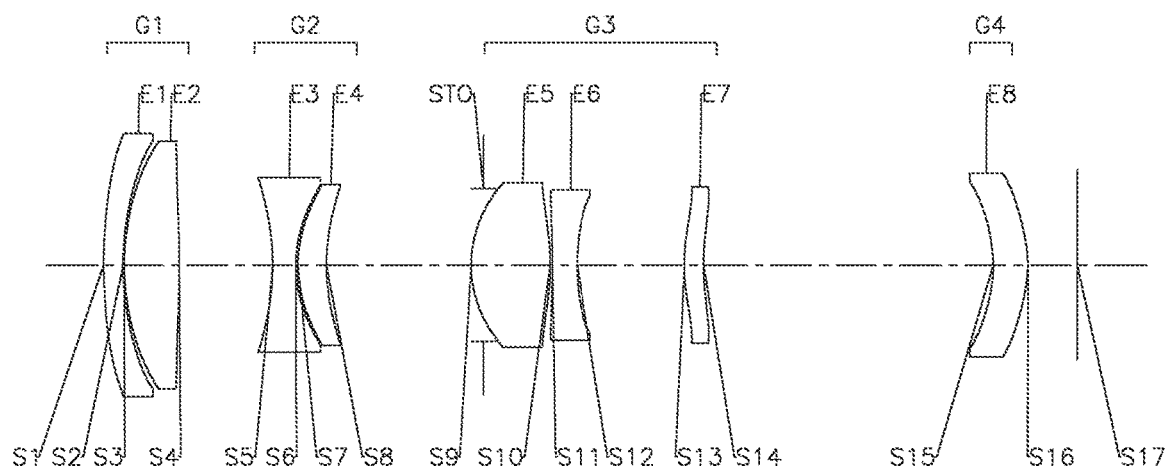
FIG. 8 shows a schematic structural view of a zoom lens assembly in an intermediate state during a transition from a wide-angle state to a telephoto state according to example 2 of the present disclosure.
Figure 9:
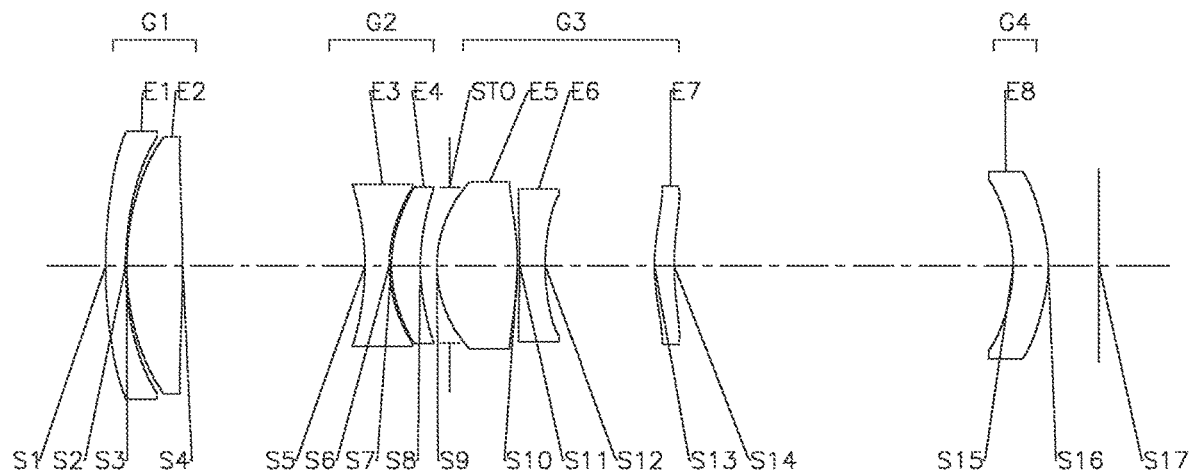
FIG. 9 shows a schematic structural view of a zoom lens assembly in a telephoto state according to example 2 of the present disclosure.

A zoom lens assembly according to example 2 of the present disclosure is described below with reference to FIGS. 7 to 12D. In the present example and the following examples, a description similar to example 1 will be omitted for brevity. FIG. 7 shows a schematic structure view of a zoom lens assembly in a wide-angle state according to example 2 of the present disclosure. FIG. 8 shows a schematic structural view of a zoom lens assembly in an intermediate state during a transition from a wide-angle state to a telephoto state according to example 2 of the present disclosure. FIG. 9 shows a schematic structural view of a zoom lens assembly in a telephoto state according to example 2 of the present disclosure.

As shown in FIGS. 7 to 9, the zoom lens assembly sequentially from an object side to an imaging side includes a first lens group G1 (a first lens E1, and a second lens E2), a second lens group G2 (a third lens E3, and a fourth lens E4), a stop STO, a third lens group G3 (a fifth lens E5, a sixth lens E6, and a seventh lens E7), a fourth lens group G4 (an eighth lens E8), and an imaging plane S17.

The first lens E1 has negative refractive power, an object-side surface S1 thereof is convex, and an image-side surface S2 thereof is concave. The second lens E2 has positive refractive power, an object-side surface S3 thereof is convex, and an image-side surface S4 thereof is convex. The third lens E3 has negative refractive power, an object-side surface S5 thereof is concave, and an image-side surface S6 thereof is concave. The fourth lens E4 has positive refractive power, an object-side surface S7 thereof is convex, and an image-side surface S8 thereof is concave. The fifth lens E5 has positive refractive power, an object-side surface S9 thereof is convex, and an image-side surface S10 thereof is convex. The sixth lens E6 has negative refractive power, an object-side surface S11 thereof is concave, and an image-side surface S12 thereof is concave. The seventh lens E7 has positive refractive power, an object-side surface S13 thereof is convex, and an image-side surface S14 thereof is concave. The eighth lens E8 has positive refractive power, an object-side surface S15 thereof is concave, and an image-side surface S16 thereof is convex. Light from an object sequentially passes through the respective surfaces S1 to S16 and is finally imaged on the imaging plane S17.

In this example, a total length TTL of the zoom lens assembly is 30.01 mm, and half of a diagonal length ImgH of an effective pixel area on the imaging plane S17 of the zoom lens assembly is 2.90 mm.

Table 4 is a table illustrating basic parameters of the zoom lens assembly of example 2, wherein the units for the radius of curvature, the thickness/distance and the focal length are millimeter (mm).

TABLE 4

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Spherical | 16.2564 | 0.6000 | 1.66 | 19.9 | −32.80 | 0.000 |
| S2 | Spherical | 9.2047 | 0.0350 | | | | 0.000 |
| S3 | Aspheric | 7.8500 | 1.6858 | 1.54 | 55.6 | 12.26 | 0.000 |

TABLE 4-continued

| Surface number | Surface type | Radius of curvature | Thickness/ Distance | Material Refractive index | Abbe number | Focal length | Conic coefficient |
|---|---|---|---|---|---|---|---|
| S4 | Aspheric | −37.9326 | D1 | | | | 0.000 |
| S5 | Aspheric | −7.0799 | 0.7321 | 1.54 | 55.6 | −4.77 | 0.000 |
| S6 | Aspheric | 4.1558 | 0.0616 | | | | 0.000 |
| S7 | Aspheric | 3.9254 | 0.8766 | 1.67 | 19.3 | 13.34 | 0.000 |
| S8 | Aspheric | 6.3057 | D2 | | | | 0.000 |
| STO | Spherical | Infinite | −0.3769 | | | | |
| S9 | Aspheric | 3.6892 | 2.4296 | 1.49 | 70.4 | 5.53 | 0.000 |
| S10 | Aspheric | −7.9243 | 0.0677 | | | | 0.000 |
| S11 | Aspheric | −28.0493 | 0.7687 | 1.61 | 25.9 | −9.25 | 0.000 |
| S12 | Aspheric | 7.2444 | 3.3143 | | | | 0.000 |
| S13 | Aspheric | 6.6614 | 0.5893 | 1.67 | 19.3 | 44.46 | 0.000 |
| S14 | Aspheric | 8.2436 | D3 | | | | 0.000 |
| S15 | Aspheric | −4.1164 | 1.0606 | 1.51 | 55.6 | 45.87 | 0.000 |
| S16 | Aspheric | −3.8449 | 2.2000 | | | | 0.000 |
| S17 | Spherical | Infinite | −0.6769 | | | | |

In this example, by changing positions of the second lens group and the third lens group along the optical axis, continuous zooming of the zoom lens assembly may be achieved. In other words, by changing the spaced interval D1 between the first lens group and the second lens group along the optical axis (i.e., a spaced interval between the image-side surface of the second lens E2 and the object-side surface of the third lens E3 along the optical axis), the spaced interval D2 between the second lens group and the third lens group along the optical axis (i.e., a spaced interval between the image-side surface of the fourth lens E4 and the object-side surface of the fifth lens E5 along the optical axis), and the spaced interval D3 between the third lens group and the fourth lens group along the optical axis (i.e., a spaced interval between the image-side surface of the seventh lens E7 and the object-side surface of the eighth lens E8 along the optical axis), the zoom lens assembly is switched from a wide-angle state to a telephoto state or from a telephoto state to a wide-angle state. A total effective focal length f a maximum field-of-view FOV, and an aperture value Fno of the zoom lens assembly vary as the zoom lens assembly switches from the wide-angle state to the telephoto state or from the telephoto state to the wide-angle state.

Table 5 is a table showing parameters corresponding to the different states of the zoom lens assembly of example 2, wherein units of f, D1, D2 and D3 are all millimeters (mm) and unit of FOV is degrees (°).

TABLE 5

| | f | FOV | Fno | D1 | D2 | D3 |
|---|---|---|---|---|---|---|
| Wide-angle state | 11.50 | 28.8 | 3.56 | 1.4087 | 7.9957 | 7.2420 |
| Intermediate state | 16.99 | 19.1 | 3.97 | 2.8810 | 4.8304 | 8.9350 |
| Telephoto state | 16.99 | 11.1 | 4.29 | 5.5202 | 0.8769 | 10.2494 |

Table 6 shows high-order coefficients applicable to each aspheric surface in example 2, wherein the surface shape of each aspheric surface may be defined by the formula (1) given in the above example 1.

TABLE 6

| Surface number | A4 | A6 | A8 | A10 | A12 | A14 | A16 |
|---|---|---|---|---|---|---|---|
| S3 | 1.2768E−04 | −1.2530E−05 | 1.7069E−06 | 1.5076E−08 | −1.2606E−09 | 1.2283E−11 | 3.3922E−13 |
| S4 | 3.9330E−05 | −1.9360E−05 | 1.2767E−06 | 1.3020E−07 | −3.4813E−09 | 1.2356E−10 | 9.6149E−13 |
| S5 | 7.5113E−05 | 8.5246E−07 | 5.5103E−07 | 9.5316E−09 | 2.2587E−09 | 0.0000E+00 | 0.0000E+00 |
| S6 | 3.4392E−04 | 9.6468E−06 | 1.5477E−06 | −1.5136E−07 | 3.9054E−08 | 0.0000E+00 | 0.0000E+00 |
| S7 | 3.8705E−03 | −6.3173E−04 | 6.3275E−05 | −3.4003E−06 | 7.7449E−08 | 0.0000E+00 | 0.0000E+00 |
| S8 | 1.1452E−04 | −3.4174E−05 | −6.6297E−05 | 4.7091E−06 | −7.3218E−08 | 0.0000E+00 | 0.0000E+00 |
| S9 | −3.7874E−03 | 1.7698E−04 | −2.3109E−05 | −2.9987E−06 | 3.0113E−07 | 0.0000E+00 | 0.0000E+00 |
| S10 | −1.4883E−03 | −2.2971E−04 | 5.4715E−05 | −3.4397E−06 | −2.5141E−07 | 3.2578E−08 | 0.0000E+00 |
| S11 | −4.7359E−04 | −2.8245E−05 | 6.8575E−06 | −5.5089E−07 | 0.0000E+00 | 0.0000E+00 | 0.0000E+00 |
| S12 | 3.9482E−03 | −1.0768E−04 | 7.4683E−05 | −1.3054E−05 | 6.5275E−07 | 0.0000E+00 | 0.0000E+00 |
| S13 | 4.1615E−04 | 2.4833E−04 | 2.7717E−05 | −4.6507E−06 | 0.0000E+00 | 0.0000E+00 | 0.0000E+00 |
| S14 | 9.2016E−04 | 4.5875E−04 | 1.1521E−05 | 6.6775E−06 | 6.4143E−07 | 0.0000E+00 | 0.0000E+00 |
| S15 | −2.4157E−03 | −8.0610E−04 | −9.6938E−06 | −1.2890E−05 | 7.0285E−06 | −7.1564E−07 | 0.0000E+00 |
| S16 | −2.4410E−03 | −6.7815E−04 | −1.7256E−04 | 5.3426E−05 | −4.2585E−06 | 0.0000E+00 | 0.0000E+00 |

Figure 10A:
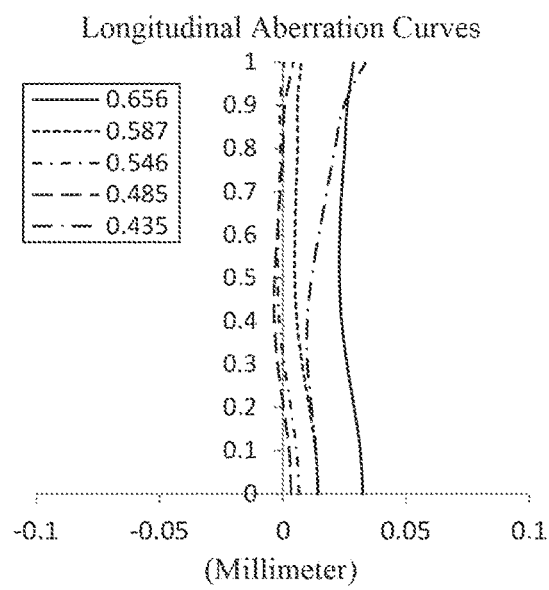
FIGS. 10A to 10D show longitudinal aberration curves, astigmatic curves, a distortion curve, and a lateral color curve, respectively, when the zoom lens assembly of example 2 is in a wide-angle state.
Figure 10B:
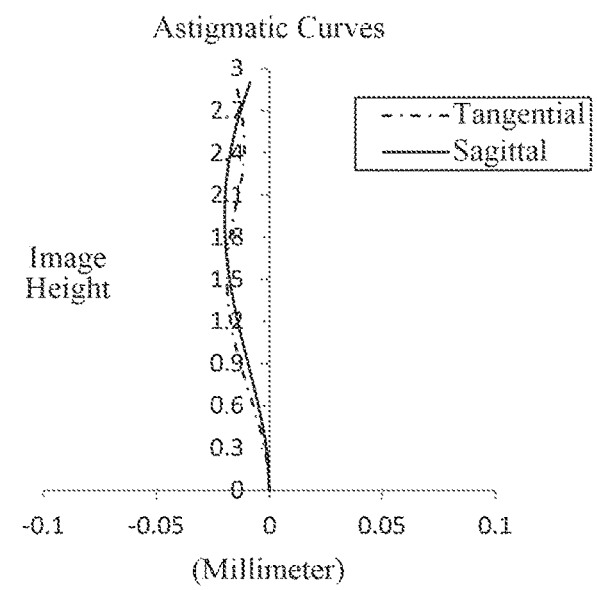
Figure 10C:
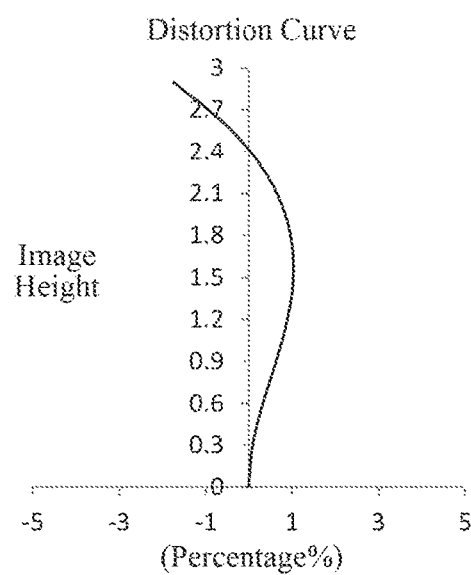
Figure 10D:
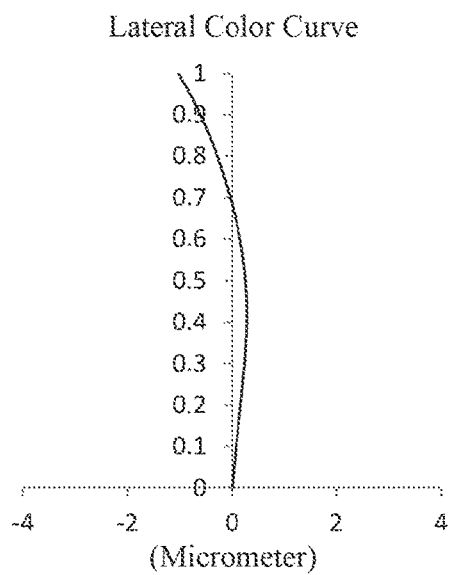
Figure 11A:
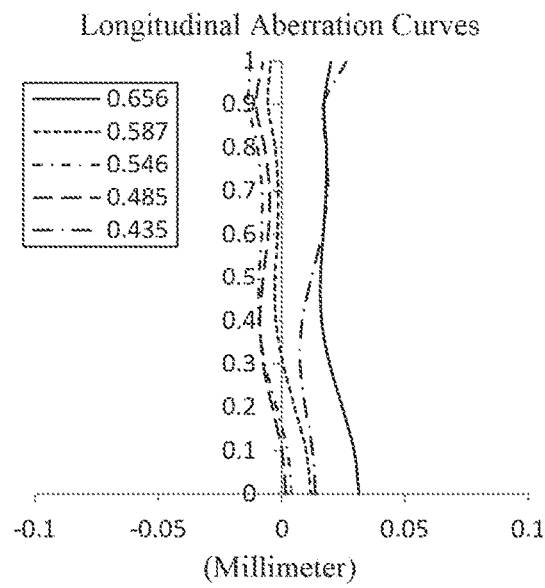
FIGS. 11A to 11D show longitudinal aberration curves, astigmatic curves, a distortion curve, and a lateral color curve, respectively, when the zoom lens assembly of example 2 is in an intermediate state during a transition from a wide-angle state to a telephoto state.
Figure 11B:
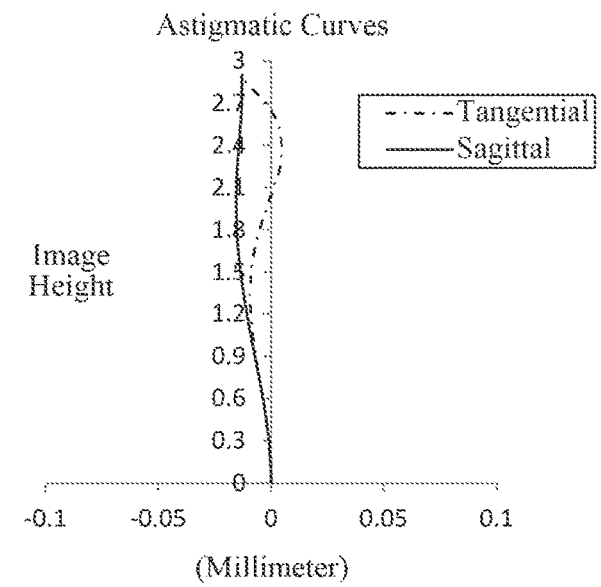
Figure 11C:
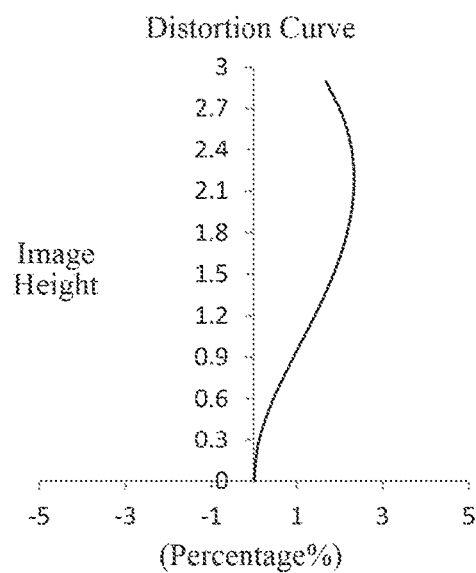
Figure 11D:
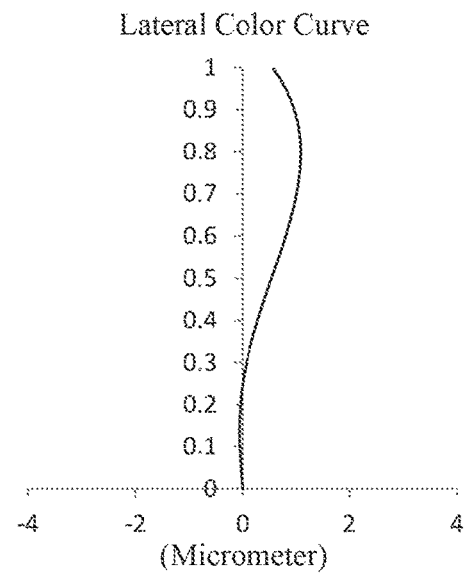
Figure 12A:
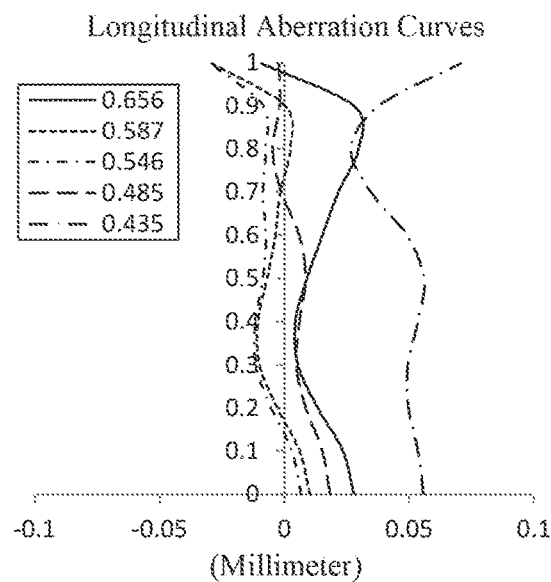
FIGS. 12A to 12D show longitudinal aberration curves, astigmatic curves, a distortion curve, and a lateral color curve, respectively, when the zoom lens assembly of example 2 is in a telephoto state.
Figure 12B:
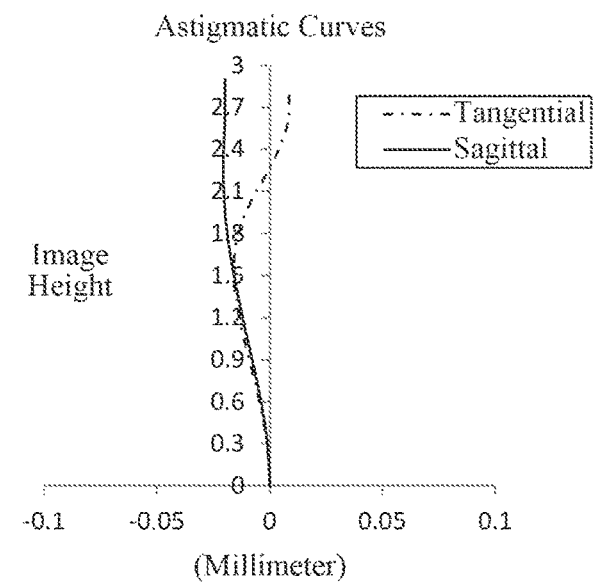
Figure 12C:
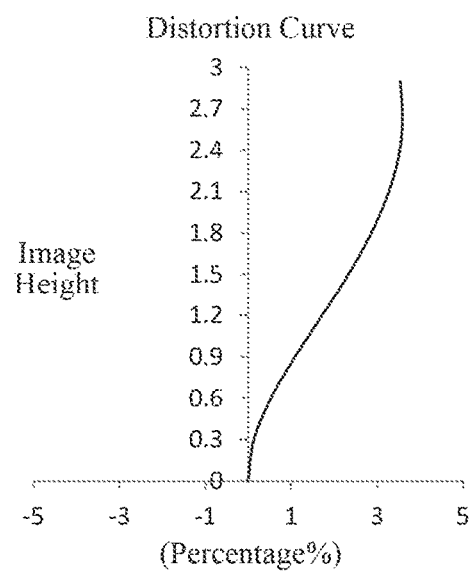
Figure 12D:
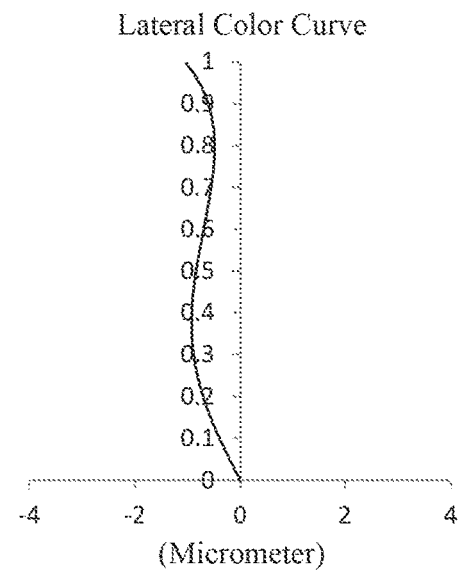

FIGS. 10A, 11A, and 12A show longitudinal aberration curves when the zoom lens assembly of example 2 is in the wide-angle state, the intermediate state, and the telephoto state, respectively, representing the deviations of focal points converged by light of different wavelengths after passing through the lens assembly. FIGS. 10B, 11B, and 12B show astigmatic curves when the zoom lens assembly of example 2 is in the wide-angle state, the intermediate state, and the telephoto state, respectively, representing the curvatures of a tangential plane and the curvatures of a sagittal plane. FIGS. 10C, 11C, and 12C show a distortion curve when the zoom lens assembly of example 2 is in the wide-angle state, the intermediate state, and the telephoto state, respectively, representing the amounts of distortion corresponding to different image heights. FIGS. 10D, 11D, and 12D show a lateral color curve when the zoom lens assembly of example 2 is in the wide-angle state, the intermediate state, and the telephoto state, respectively, representing the deviations of different image heights on an imaging plane after light passes through the lens assembly. As can be seen from FIGS. 10A to 12D, the zoom lens assembly according to example 2 can achieve good imaging quality in each state.

Example 3

Figure 13:
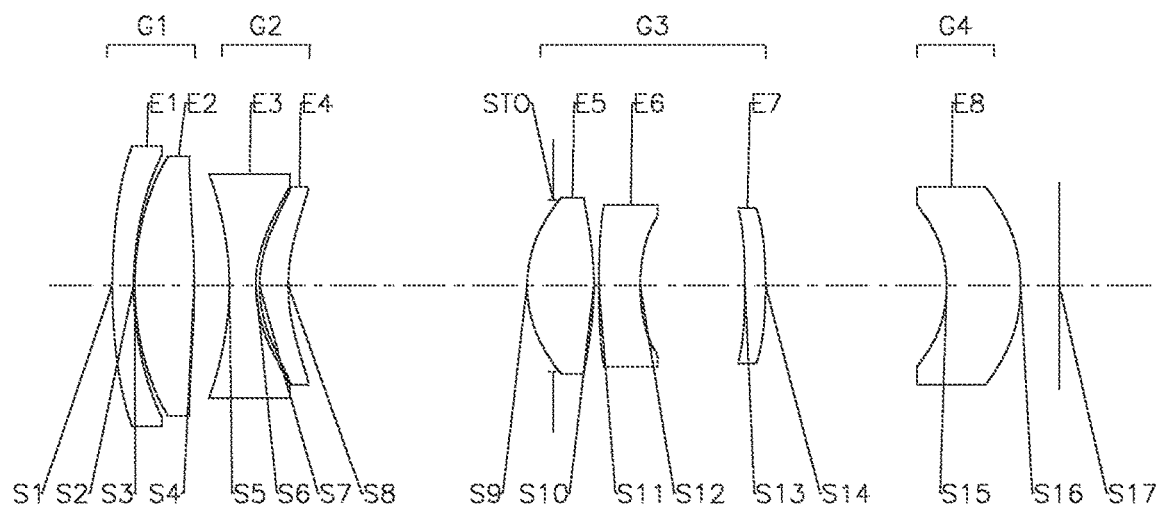
FIG. 13 shows a schematic structural view of a zoom lens assembly in a wide-angle state according to example 3 of the present disclosure.
Figure 14:
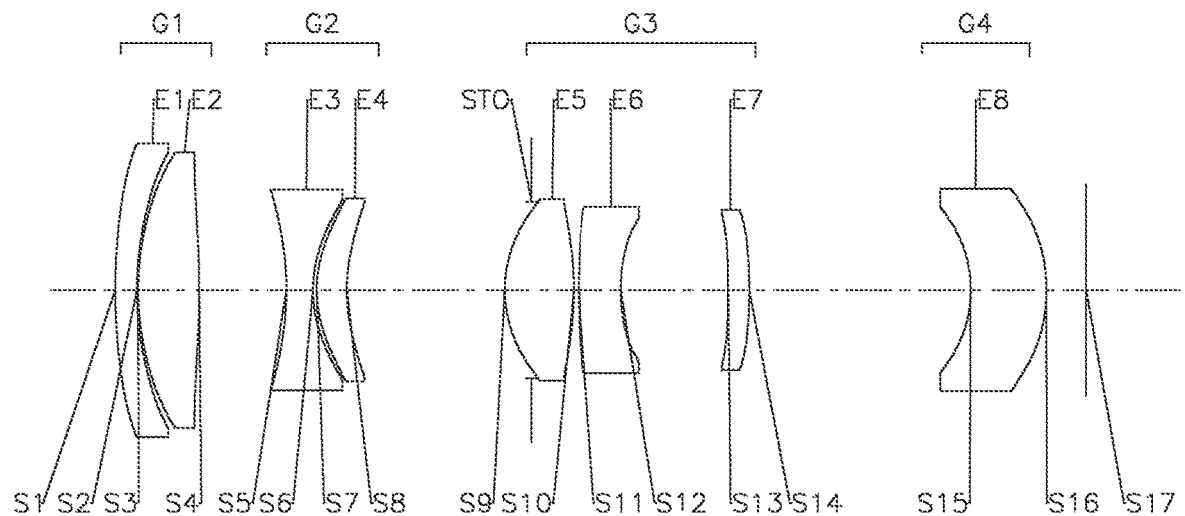
FIG. 14 shows a schematic structural view of a zoom lens assembly in an intermediate state during a transition from a wide-angle state to a telephoto state according to example 3 of the present disclosure.
Figure 15:
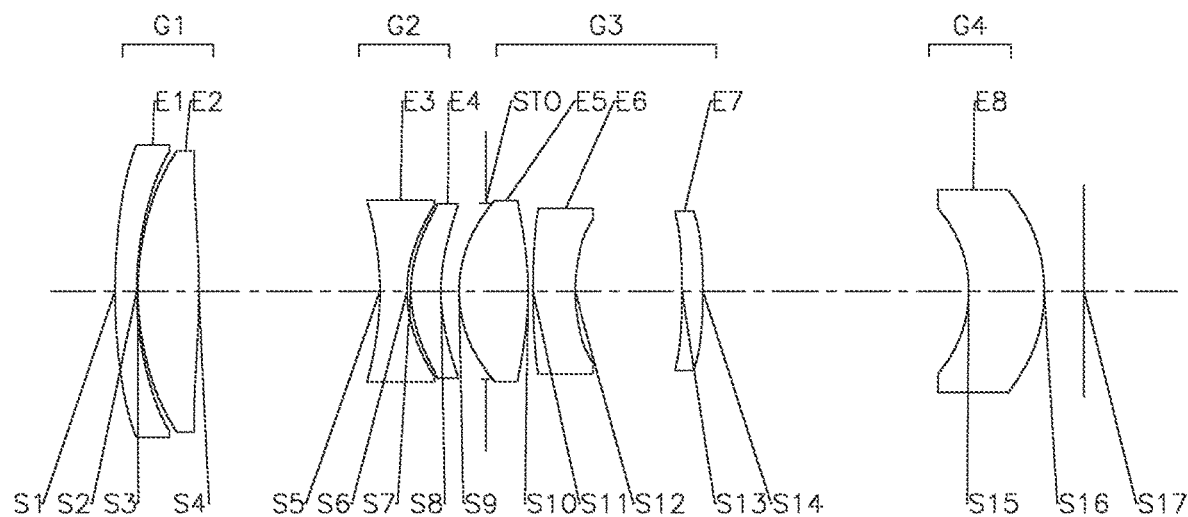
FIG. 15 shows a schematic structural view of a zoom lens assembly in a telephoto state according to example 3 of the present disclosure.

A zoom lens assembly according to example 3 of the present disclosure is described below with reference to FIGS. 13 to 18D. FIG. 13 shows a schematic structure view of a zoom lens assembly in a wide-angle state according to example 3 of the present disclosure. FIG. 14 shows a schematic structural view of a zoom lens assembly in an intermediate state during a transition from a wide-angle state to a telephoto state according to example 3 of the present disclosure. FIG. 15 shows a schematic structural view of a zoom lens assembly in a telephoto state according to example 3 of the present disclosure.

As shown in FIGS. 13 to 15, the zoom lens assembly sequentially from an object side to an imaging side includes a first lens group G1 (a first lens E1, and a second lens E2), a second lens group G2 (a third lens E3, and a fourth lens E4), a stop STO, a third lens group G3 (a fifth lens E5, a sixth lens E6, and a seventh lens E7), a fourth lens group G4 (an eighth lens E8), and an imaging plane S17.

The first lens E1 has negative refractive power, an object-side surface S1 thereof is convex, and an image-side surface S2 thereof is concave. The second lens E2 has positive refractive power, an object-side surface S3 thereof is convex, and an image-side surface S4 thereof is convex. The third lens E3 has negative refractive power, an object-side surface S5 thereof is concave, and an image-side surface S6 thereof is concave. The fourth lens E4 has positive refractive power, an object-side surface S7 thereof is convex, and an image-side surface S8 thereof is concave. The fifth lens E5 has positive refractive power, an object-side surface S9 thereof is convex, and an image-side surface S10 thereof is convex. The sixth lens E6 has negative refractive power, an object-side surface S11 thereof is convex, and an image-side surface S12 thereof is concave. The seventh lens E7 has positive refractive power, an object-side surface S13 thereof is concave, and an image-side surface S14 thereof is convex. The eighth lens E8 has negative refractive power, an object-side surface S15 thereof is concave, and an image-side surface S16 thereof is convex. Light from an object sequentially passes through the respective surfaces S1 to S16 and is finally imaged on the imaging plane S17.

In this example, a total length TTL of the zoom lens assembly is 26.83 mm, and half of a diagonal length ImgH of an effective pixel area on the imaging plane S17 of the zoom lens assembly is 2.90 mm.

Table 7 is a table illustrating basic parameters of the zoom lens assembly of example 3, wherein the units for the radius of curvature, the thickness/distance and the focal length are millimeter (mm).

TABLE 7

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | Infinite | | | | |
| S1 | Spherical | 16.8187 | 0.6000 | 1.67 | 19.3 | −30.38 | −0.487 |
| S2 | Spherical | 9.1279 | 0.0350 | | | | −0.141 |
| S3 | Aspheric | 7.9712 | 1.6788 | 1.54 | 55.6 | 11.67 | −0.081 |
| S4 | Aspheric | −27.1831 | D1 | | | | −0.473 |
| S5 | Aspheric | −7.9089 | 0.7522 | 1.54 | 55.6 | −4.69 | 0.549 |
| S6 | Aspheric | 3.8202 | 0.1000 | | | | −0.063 |
| S7 | Aspheric | 3.4828 | 0.8315 | 1.67 | 19.3 | 13.52 | −0.037 |
| S8 | Aspheric | 5.0731 | D2 | | | | −0.315 |
| STO | Spherical | Infinite | −0.7394 | | | | |
| S9 | Aspheric | 3.4991 | 1.9064 | 1.49 | 69.9 | 5.31 | −0.016 |
| S10 | Aspheric | −8.5568 | 0.1403 | | | | 1.971 |
| S11 | Aspheric | 20.4541 | 1.1675 | 1.63 | 23.6 | −10.52 | −68.348 |
| S12 | Aspheric | 4.9143 | 2.9642 | | | | −0.028 |
| S13 | Aspheric | −21.7435 | 0.5807 | 1.67 | 19.3 | 61.09 | −37.824 |
| S14 | Aspheric | −14.4163 | D3 | | | | −5.841 |
| S15 | Aspheric | −3.6830 | 2.0827 | 1.54 | 55.6 | −31.42 | 0.916 |
| S16 | Aspheric | −5.6420 | 2.2000 | | | | 2.101 |
| S17 | Spherical | Infinite | −1.1000 | | | | |

In this example, by changing positions of the second lens group and the third lens group along the optical axis, continuous zooming of the zoom lens assembly may be achieved. In other words, by changing the spaced interval D1 between the first lens group and the second lens group along the optical axis (i.e., a spaced interval between the image-side surface of the second lens E2 and the object-side surface of the third lens E3 along the optical axis), the spaced interval D2 between the second lens group and the third lens group along the optical axis (i.e., a spaced interval between the image-side surface of the fourth lens E4 and the object-side surface of the fifth lens E5 along the optical axis), and the spaced interval D3 between the third lens group and the fourth lens group along the optical axis (i.e., a spaced interval between the image-side surface of the seventh lens E7 and the object-side surface of the eighth lens E8 along the optical axis), the zoom lens assembly is switched from a wide-angle state to a telephoto state or from a telephoto state to a wide-angle state. A total effective focal length f a maximum field-of-view FOV, and an aperture value Fno of the zoom lens assembly vary as the zoom lens assembly switches from the wide-angle state to the telephoto state or from the telephoto state to the wide-angle state.

Table 8 is a table showing parameters corresponding to the different states of the zoom lens assembly of example 3, wherein units of f, D1, D2 and D3 are all millimeters (mm) and unit of FOV is degrees (°).

TABLE 8

| | f | FOV | Fno | D1 | D2 | D3 |
|---|---|---|---|---|---|---|
| Wide-angle state | 11.50 | 29.6 | 3.51 | 0.9945 | 7.4914 | 5.1436 |
| Intermediate state | 15.89 | 21.0 | 3.80 | 2.4086 | 5.0946 | 6.1263 |
| Telephoto state | 27.50 | 12.0 | 4.15 | 5.0271 | 1.2394 | 7.3630 |

Table 9 shows high-order coefficients applicable to each aspheric surface in example 3, wherein the surface shape of each aspheric surface may be defined by the formula (1) given in the above example 1.

TABLE 9

| Surface number | A4 | A6 | A8 | A10 | A12 | A14 | A16 |
|---|---|---|---|---|---|---|---|
| S3 | 1.3270E−04 | −1.4316E−05 | 1.7262E−06 | 1.1125E−08 | −1.2386E−09 | 3.3890E−11 | −4.5166E−14 |
| S4 | −4.7905E−05 | −2.4412E−05 | 9.1490E−07 | 1.3487E−07 | −3.1750E−09 | 1.0145E−10 | 1.6496E−12 |
| S5 | 1.4252E−05 | −3.5295E−06 | 5.6739E−07 | 7.7652E−09 | 2.9307E−09 | 0.0000E+00 | 0.0000E+00 |
| S6 | 3.9878E−04 | 1.0299E−05 | 1.7669E−06 | −1.3736E−07 | 3.6890E−09 | 0.0000E+00 | 0.0000E+00 |
| S7 | 3.4018E−03 | −5.9109E−04 | 6.1677E−05 | −3.5180E−06 | 9.7115E−08 | 0.0000E+00 | 0.0000E+00 |
| S8 | −8.2841E−05 | −1.4623E−04 | −7.8436E−05 | 4.3659E−06 | 6.7049E−08 | 0.0000E+00 | 0.0000E+00 |
| S9 | −5.0791E−03 | 2.9563E−05 | −3.4650E−05 | −3.8194E−06 | 2.3432E−07 | 0.0000E+00 | 0.0000E+00 |
| S10 | −2.8150E−03 | −2.2063E−04 | 5.0499E−05 | −4.4876E−06 | −3.9085E−07 | 4.3004E−08 | 0.0000E+00 |
| S11 | −8.1843E−04 | −1.2479E−04 | 5.7155E−06 | −1.2199E−06 | −1.4775E−08 | −1.5052E−08 | 0.0000E+00 |
| S12 | 3.2944E−03 | −2.1758E−04 | 6.5279E−05 | −1.1619E−05 | 6.6978E−07 | −3.2725E−09 | 0.0000E+00 |
| S13 | 3.9391E−05 | 1.6530E−04 | 2.6193E−05 | −4.7632E−06 | −3.4203E−08 | 6.1515E−08 | 0.0000E+00 |
| S14 | 1.2255E−03 | 8.2563E−04 | 3.4283E−05 | 2.6576E−06 | 2.3601E−06 | 1.9593E−07 | 0.0000E+00 |
| S15 | −1.3234E−03 | −7.2079E−04 | −5.0460E−06 | −2.8592E−06 | 7.4367E−06 | −1.1209E−06 | 0.0000E+00 |
| S16 | −1.4967E−03 | −4.9101E−04 | −1.4873E−04 | 5.4767E−05 | −5.3236E−06 | 0.0000E+00 | 0.0000E+00 |

Figure 16A:
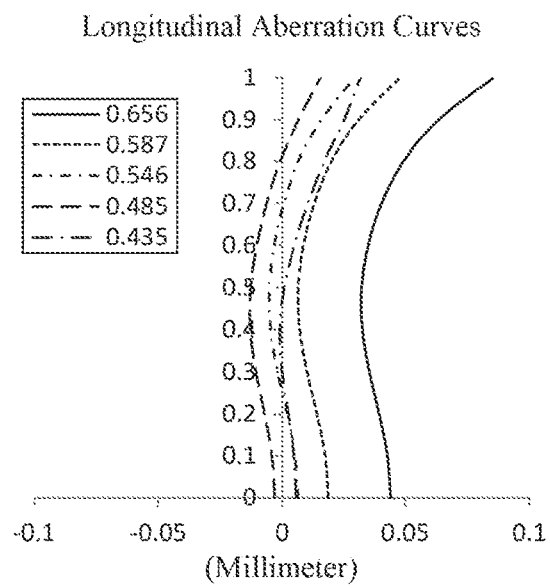
FIGS. 16A to 16D show longitudinal aberration curves, astigmatic curves, a distortion curve, and a lateral color curve, respectively, when the zoom lens assembly of example 3 is in a wide-angle state.
Figure 16B:
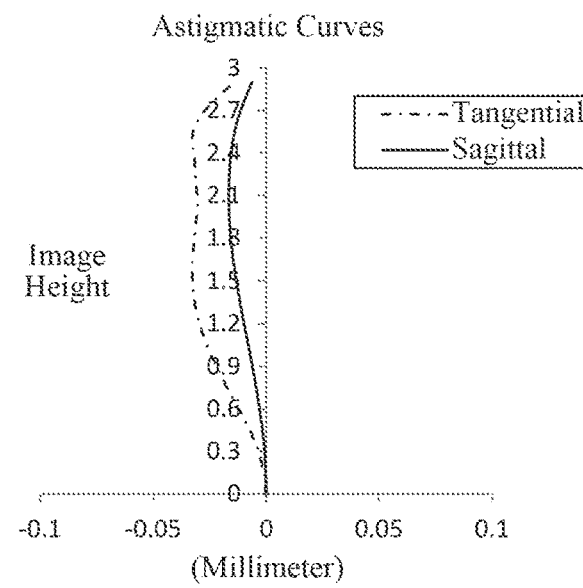
Figure 16C:
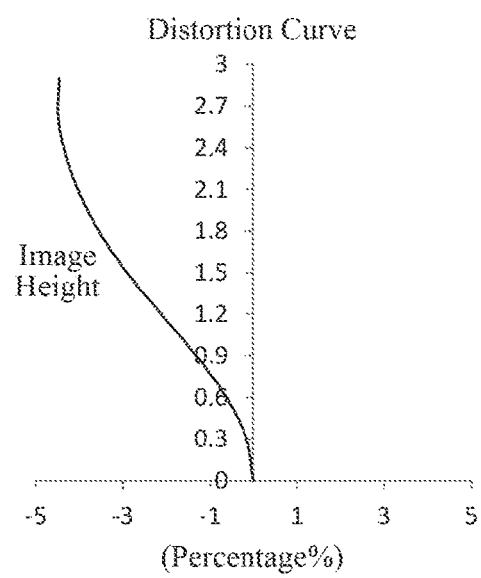
Figure 16D:
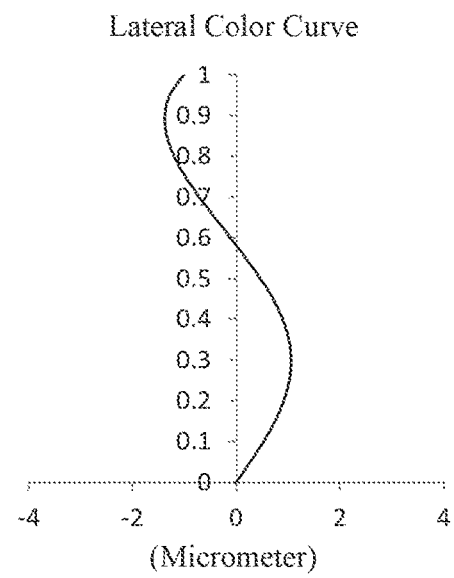
Figure 17A:
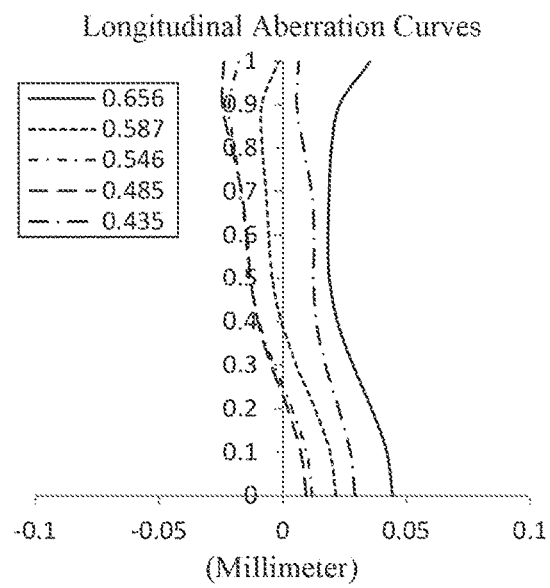
FIGS. 17A to 17D show longitudinal aberration curves, astigmatic curves, a distortion curve, and a lateral color curve, respectively, when the zoom lens assembly of example 3 is in an intermediate state during a transition from a wide-angle state to a telephoto state.
Figure 17B:
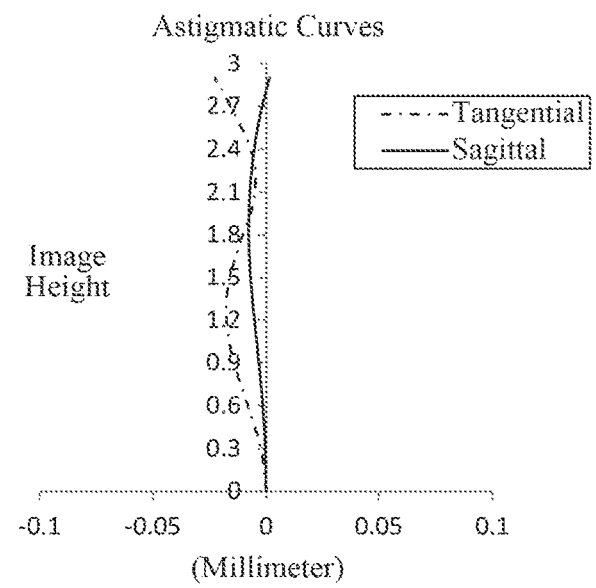
Figure 17C:
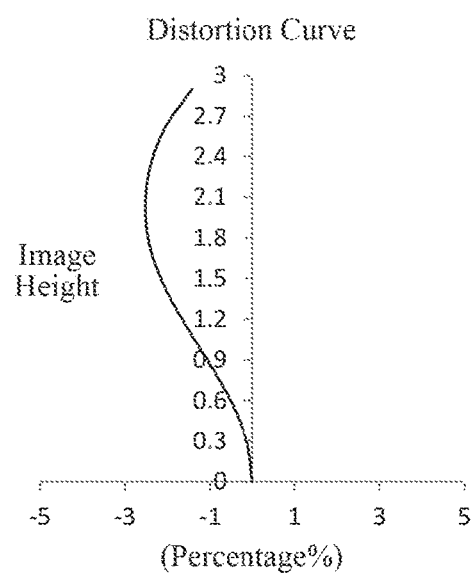
Figure 17D:
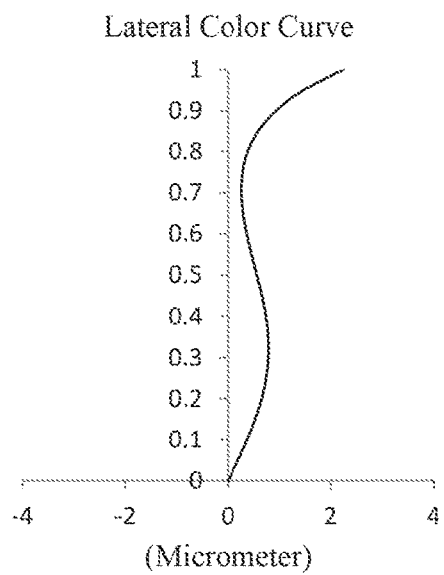
Figure 18A:
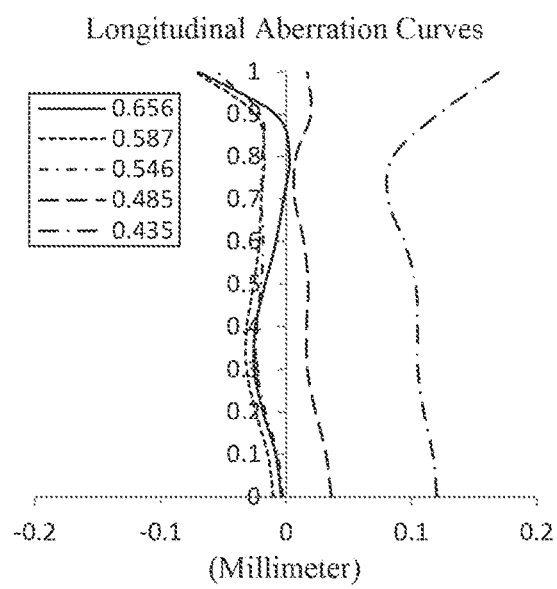
FIGS. 18A to 18D show longitudinal aberration curves, astigmatic curves, a distortion curve, and a lateral color curve, respectively, when the zoom lens assembly of example 3 is in a telephoto state.
Figure 18B:
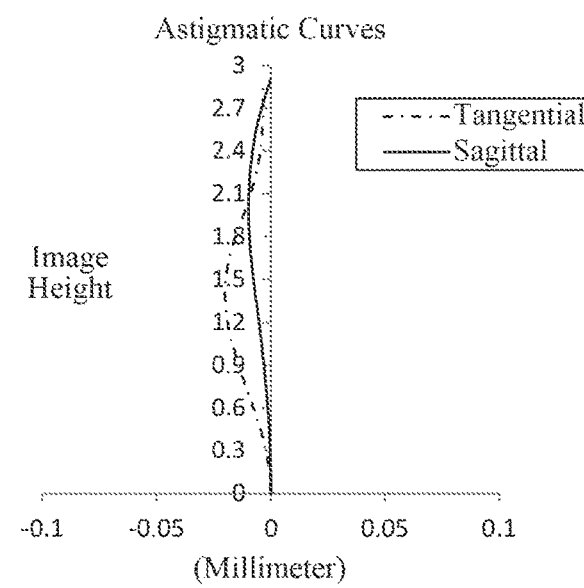
Figure 18C:
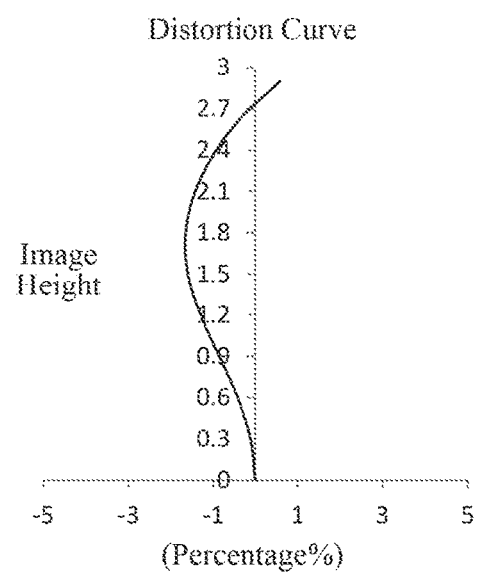
Figure 18D:
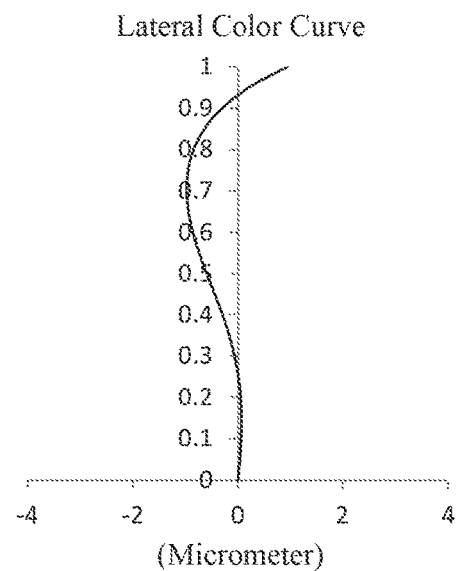

FIGS. 16A, 17A, and 18A show longitudinal aberration curves when the zoom lens assembly of example 3 is in the wide-angle state, the intermediate state, and the telephoto state, respectively, representing the deviations of focal points converged by light of different wavelengths after passing through the lens assembly. FIGS. 16B, 17B, and 18B show astigmatic curves when the zoom lens assembly of example 3 is in the wide-angle state, the intermediate state, and the telephoto state, respectively, representing the curvatures of a tangential plane and the curvatures of a sagittal plane. FIGS. 16C, 17C, and 18C show a distortion curve when the zoom lens assembly of example 3 is in the wide-angle state, the intermediate state, and the telephoto state, respectively, representing the amounts of distortion corresponding to different image heights. FIGS. 16D, 17D, and 18D show a lateral color curve when the zoom lens assembly of example 3 is in the wide-angle state, the intermediate state, and the telephoto state, respectively, representing the deviations of different image heights on an imaging plane after light passes through the lens assembly. As can be seen from FIGS. 16A to 18D, the zoom lens assembly according to example 3 can achieve good imaging quality in each state.

Example 4

Figure 19:
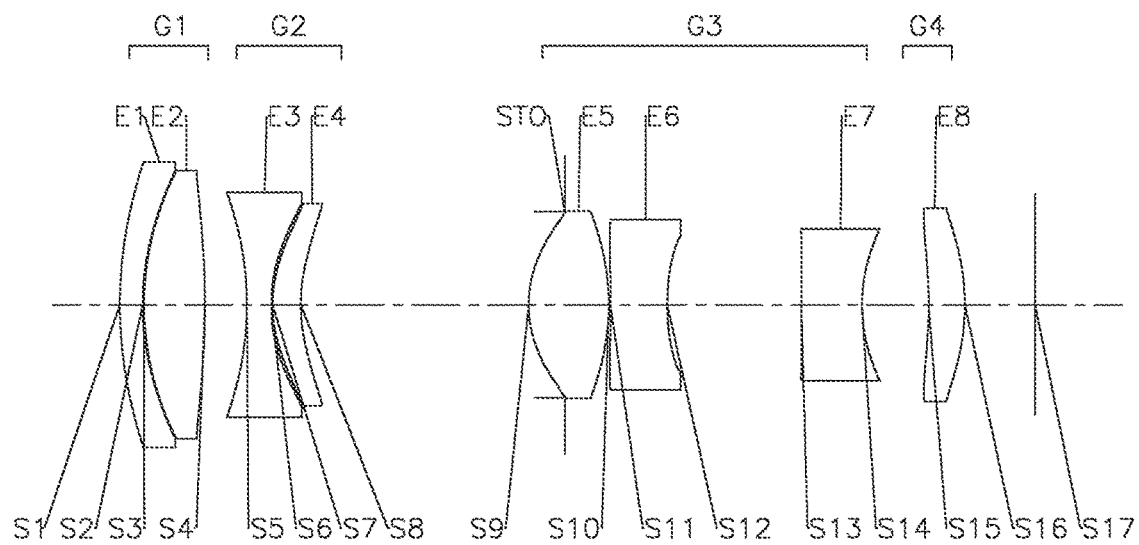
FIG. 19 shows a schematic structural view of a zoom lens assembly in a wide-angle state according to example 4 of the present disclosure.
Figure 20:
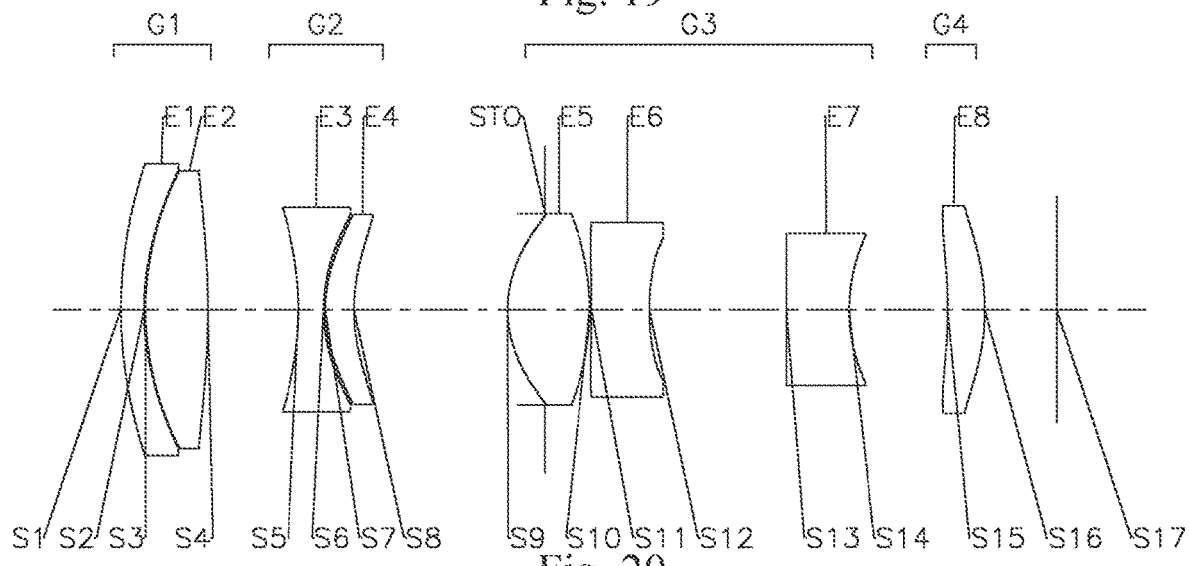
FIG. 20 shows a schematic structural view of a zoom lens assembly in an intermediate state during a transition from a wide-angle state to a telephoto state according to example 4 of the present disclosure.
Figure 21:
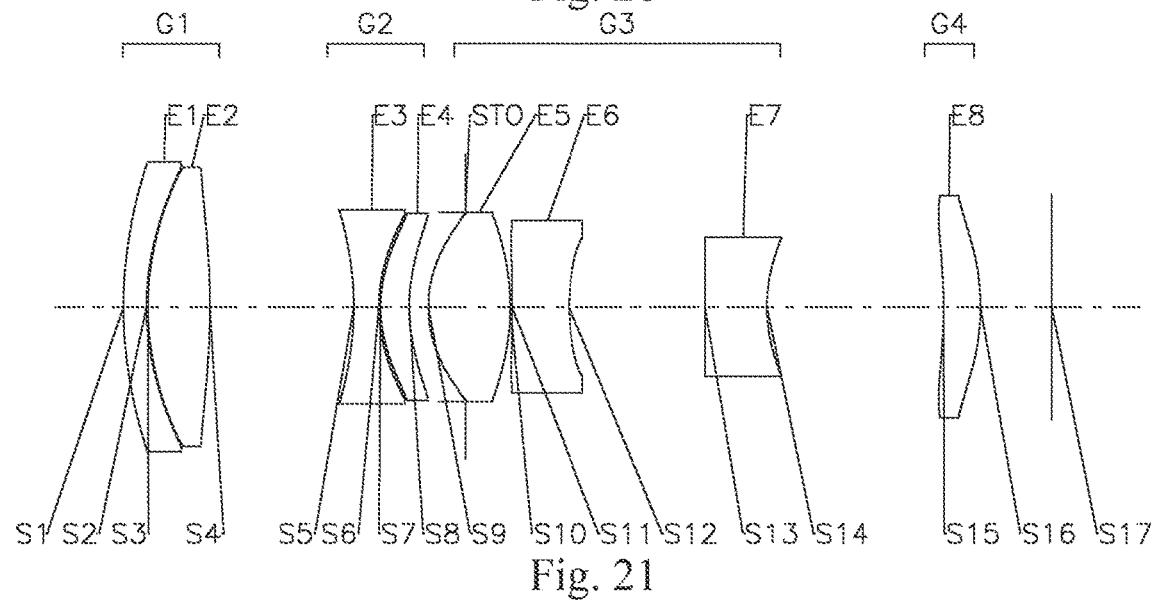
FIG. 21 shows a schematic structural view of a zoom lens assembly in a telephoto state according to example 4 of the present disclosure.

A zoom lens assembly according to example 4 of the present disclosure is described below with reference to FIGS. 19 to 24D. FIG. 19 shows a schematic structure view of a zoom lens assembly in a wide-angle state according to example 4 of the present disclosure. FIG. 20 shows a schematic structural view of a zoom lens assembly in an intermediate state during a transition from a wide-angle state to a telephoto state according to example 4 of the present disclosure. FIG. 21 shows a schematic structural view of a zoom lens assembly in a telephoto state according to example 4 of the present disclosure.

As shown in FIGS. 19 to 21, the zoom lens assembly sequentially includes a first lens group G1 (a first lens E1, and a second lens E2), a second lens group G2 (a third lens E3, and a fourth lens E4), a stop STO, a third lens group G3 (a fifth lens E5, a sixth lens E6, and a seventh lens E7), a fourth lens group G4 (an eighth lens E8), and an imaging plane S17, from an object side to an imaging side.

The first lens E1 has negative refractive power, an object-side surface S1 thereof is convex, and an image-side surface S2 thereof is concave. The second lens E2 has positive refractive power, an object-side surface S3 thereof is convex, and an image-side surface S4 thereof is convex. The third lens E3 has negative refractive power, an object-side surface S5 thereof is convex, and an image-side surface S6 thereof is concave. The fourth lens E4 has positive refractive power, an object-side surface S7 thereof is convex, and an image-side surface S8 thereof is concave. The fifth lens E5 has positive refractive power, an object-side surface S9 thereof is convex, and an image-side surface S10 thereof is convex. The sixth lens E6 has negative refractive power, an object-side surface S11 thereof is concave, and an image-side surface S12 thereof is concave. The seventh lens E7 has negative refractive power, an object-side surface S13 thereof is convex, and an image-side surface S14 thereof is concave. The eighth lens E8 has positive refractive power, an object-side surface S15 thereof is concave, and an image-side surface S16 thereof is convex. Light from an object sequentially passes through the respective surfaces S1 to S16 and is finally imaged on the imaging plane S17.

In this example, a total length TTL of the zoom lens assembly is 24.15 mm, and half of a diagonal length ImgH of an effective pixel area on the imaging plane S17 of the zoom lens assembly is 2.90 mm.

Table 10 is a table illustrating basic parameters of the zoom lens assembly of example 4, wherein the units for the radius of curvature, the thickness/distance and the focal length are millimeter (mm).

TABLE 10

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Spherical | 11.3902 | 0.6000 | 1.67 | 19.5 | −29.71 | −0.769 |
| S2 | Spherical | 7.1113 | 0.0350 | | | | −0.366 |
| S3 | Aspheric | 7.5228 | 1.6057 | 1.54 | 55.6 | 10.69 | −0.410 |
| S4 | Aspheric | −22.4441 | D1 | | | | 9.982 |
| S5 | Aspheric | −7.8212 | 0.6509 | 1.54 | 65.8 | −5.10 | 1.081 |
| S6 | Aspheric | 4.3367 | 0.0400 | | | | −0.005 |
| S7 | Aspheric | 3.6161 | 0.7435 | 1.67 | 19.3 | 18.01 | −0.077 |
| S8 | Aspheric | 4.7093 | D2 | | | | −0.832 |
| STO | Spherical | Infinite | −0.9607 | | | | |
| S9 | Aspheric | 3.1931 | 2.1285 | 1.50 | 68.7 | 4.44 | −0.082 |
| S10 | Aspheric | −5.8668 | 0.0400 | | | | 1.183 |
| S11 | Aspheric | −233.9642 | 1.4958 | 1.75 | 27.6 | −8.18 | 99.000 |
| S12 | Aspheric | 6.4160 | 3.5307 | | | | 0.519 |
| S13 | Aspheric | 67.2360 | 1.6129 | 1.54 | 55.6 | −8.77 | 91.308 |
| S14 | Aspheric | 4.3644 | D3 | | | | 0.421 |
| S15 | Aspheric | −16.4526 | 0.9570 | 1.67 | 19.3 | 16.25 | 29.038 |
| S16 | Aspheric | −6.7575 | 2.2000 | | | | −26.771 |
| S17 | Spherical | Infinite | −0.3483 | | | | |

In this example, by changing positions of the second lens group and the third lens group along the optical axis, continuous zooming of the zoom lens assembly may be achieved. In other words, by changing the spaced interval D1 between the first lens group and the second lens group along the optical axis (i.e., a spaced interval between the image-side surface of the second lens E2 and the object-side surface of the third lens E3 along the optical axis), the spaced interval D2 between the second lens group and the third lens group along the optical axis (i.e., a spaced interval between the image-side surface of the fourth lens E4 and the object-side surface of the fifth lens E5 along the optical axis), and the spaced interval D3 between the third lens group and the fourth lens group along the optical axis (i.e., a spaced interval between the image-side surface of the seventh lens E7 and the object-side surface of the eighth lens E8 along the optical axis), the zoom lens assembly is switched from a wide-angle state to a telephoto state or from a telephoto state to a wide-angle state. A total effective focal length f, a maximum field-of-view FOV, and an aperture value Fno of the zoom lens assembly vary as the zoom lens assembly switches from the wide-angle state to the telephoto state or from the telephoto state to the wide-angle state.

Table 11 is a table showing parameters corresponding to the different states of the zoom lens assembly of example 4, wherein units of f, D1, D2 and D3 are all millimeters (mm) and unit of FOV is degrees (°).

TABLE 11

| | f | FOV | Fno | D1 | D2 | D3 |
|---|---|---|---|---|---|---|
| Wide-angle state | 11.50 | 27.8 | 3.15 | 1.1083 | 6.9598 | 1.7505 |
| Intermediate state | 15.89 | 20.0 | 3.48 | 2.3470 | 4.9191 | 2.5525 |
| Telephoto state | 27.50 | 11.9 | 4.32 | 3.7589 | 1.4607 | 4.5990 |

Table 12 shows high-order coefficients applicable to each aspheric surface in example 4, wherein the surface shape of each aspheric surface may be defined by the formula (1) given in the above example 1.

TABLE 12

| Surface number | A4 | A6 | A8 | A10 | A12 | A14 | A16 |
|---|---|---|---|---|---|---|---|
| S3 | 8.0987E−05 | −2.0837E−05 | 1.0676E−06 | 4.6439E−09 | −1.6950E−09 | −1.8858E−11 | 3.9667E−12 |
| S4 | −1.5683E−04 | −3.3638E−05 | 5.6912E−07 | 7.3338E−08 | −4.5534E−09 | 2.4111E−10 | −6.0822E−12 |
| S5 | −1.5418E−04 | −4.6317E−06 | −2.3417E−07 | 1.6229E−08 | 4.9547E−09 | 0.0000E+00 | 0.0000E+00 |
| S6 | 2.5975E−04 | 5.5077E−06 | 1.3644E−06 | −1.4296E−07 | 8.7319E−09 | 0.0000E+00 | 0.0000E+00 |
| S7 | 2.9123E−03 | −5.2854E−04 | 6.2168E−05 | −3.8754E−06 | 1.1024E−07 | 0.0000E+00 | 0.0000E+00 |
| S8 | 7.6497E−05 | −1.2868E−04 | −6.5814E−05 | 5.0718E−06 | 1.5939E−08 | 0.0000E+00 | 0.0000E+00 |
| S9 | −5.4928E−03 | 2.9185E−05 | −3.0246E−05 | −2.1941E−06 | 2.0830E−07 | 0.0000E+00 | 0.0000E+00 |
| S10 | −3.5317E−03 | −1.9753E−04 | 5.7494E−05 | −5.0731E−06 | −3.0622E−07 | 3.7304E−08 | 0.0000E+00 |
| S11 | −1.2735E−03 | −1.8551E−04 | −1.0296E−05 | −2.5137E−06 | −2.0311E−07 | −5.3314E−08 | 0.0000E+00 |
| S12 | 3.6764E−03 | −2.4358E−04 | 5.9268E−05 | −1.1647E−05 | 8.1528E−07 | −2.8125E−08 | 0.0000E+00 |
| S13 | −1.6205E−03 | 1.3898E−04 | 4.4777E−05 | 5.1264E−07 | 3.8283E−07 | 1.8061E−08 | 0.0000E+00 |
| S14 | 2.3233E−03 | 8.0019E−04 | 1.4976E−04 | 1.4529E−05 | −2.3387E−06 | 2.0950E−06 | 0.0000E+00 |
| S15 | −1.3412E−03 | −5.6876E−04 | 9.5152E−05 | −2.3528E−05 | 1.1082E−05 | −1.6078E−06 | 0.0000E+00 |
| S16 | −4.5672E−04 | −4.5129E−04 | −1.0258E−04 | 4.2713E−05 | −4.5720E−06 | 0.0000E+00 | 0.0000E+00 |

Figure 22A:
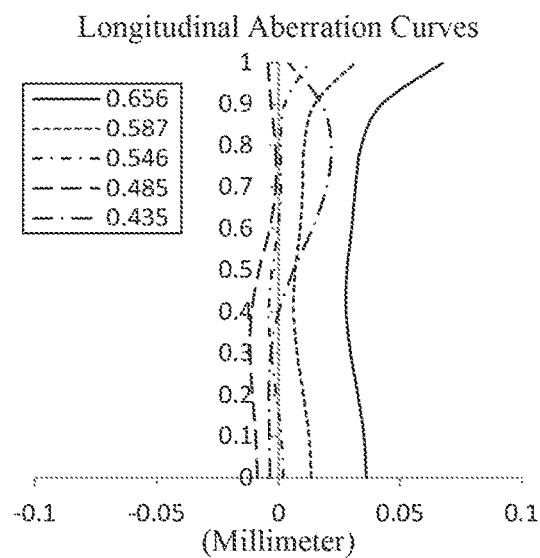
FIGS. 22A to 22D show longitudinal aberration curves, astigmatic curves, a distortion curve, and a lateral color curve, respectively, when the zoom lens assembly of example 4 is in a wide-angle state.
Figure 22B:
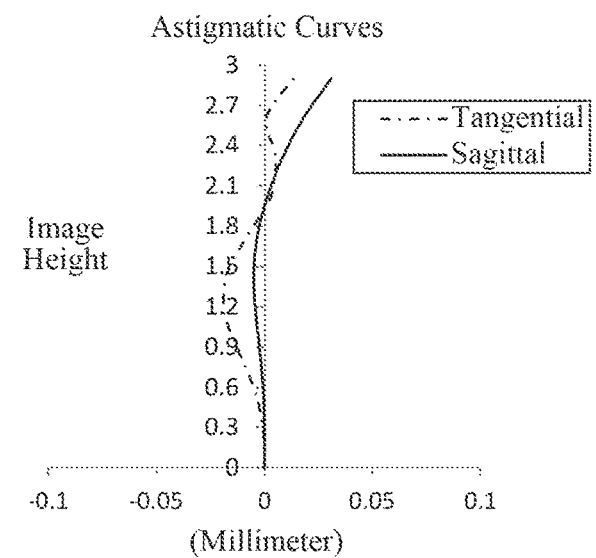
Figure 22C:
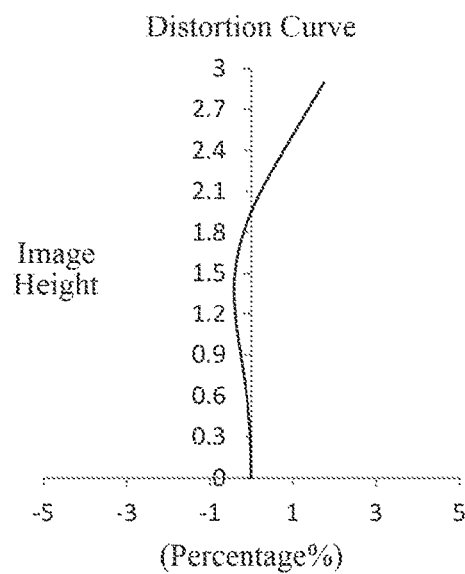
Figure 22D:
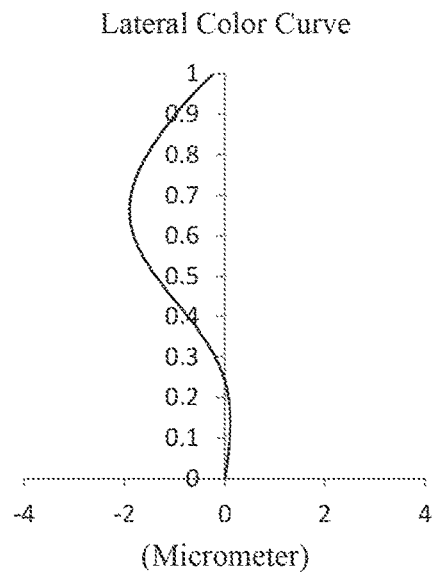
Figure 23A:
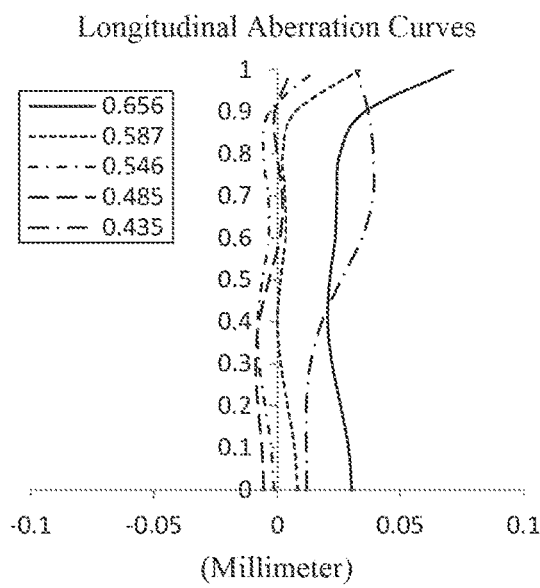
FIGS. 23A to 23D show longitudinal aberration curves, astigmatic curves, a distortion curve, and a lateral color curve, respectively, when the zoom lens assembly of example 4 is in an intermediate state during a transition from a wide-angle state to a telephoto state.
Figure 23B:
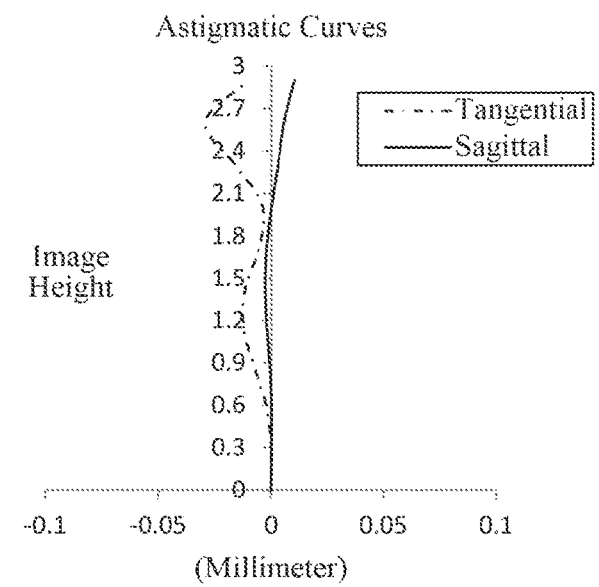
Figure 23C:
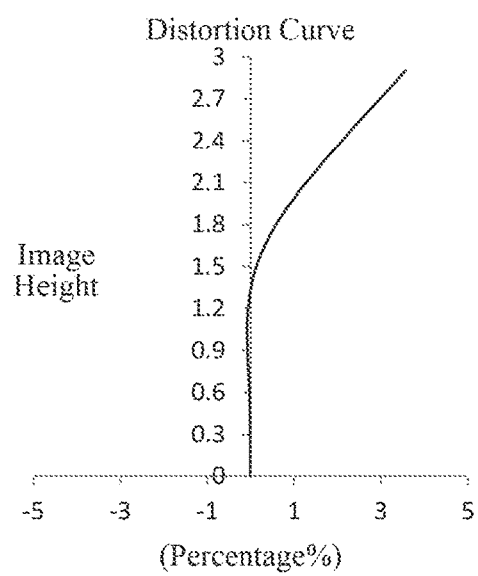
Figure 23D:
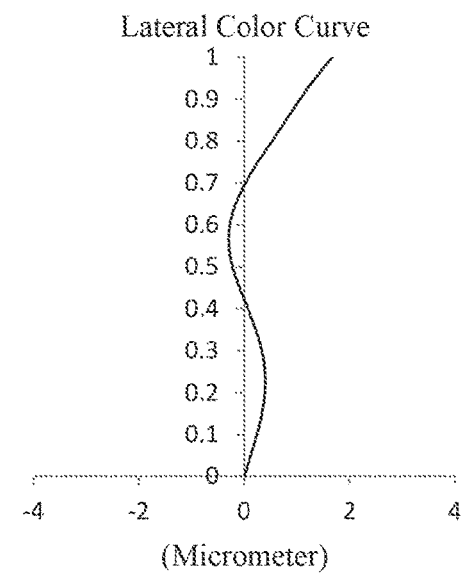
Figure 24A:
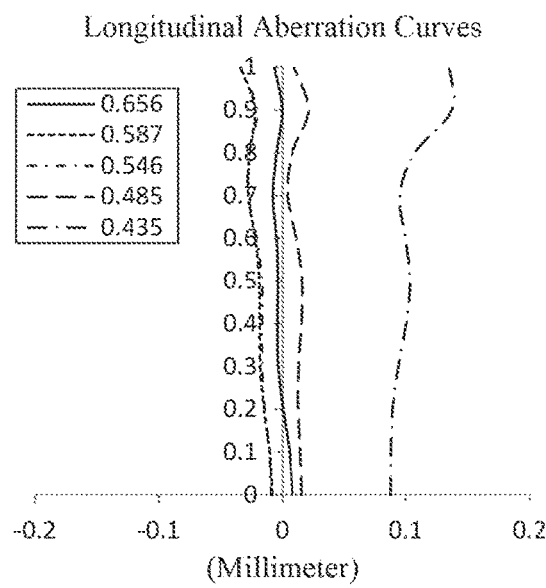
FIGS. 24A to 24D show longitudinal aberration curves, astigmatic curves, a distortion curve, and a lateral color curve, respectively, when the zoom lens assembly of example 4 is in a telephoto state.
Figure 24B:
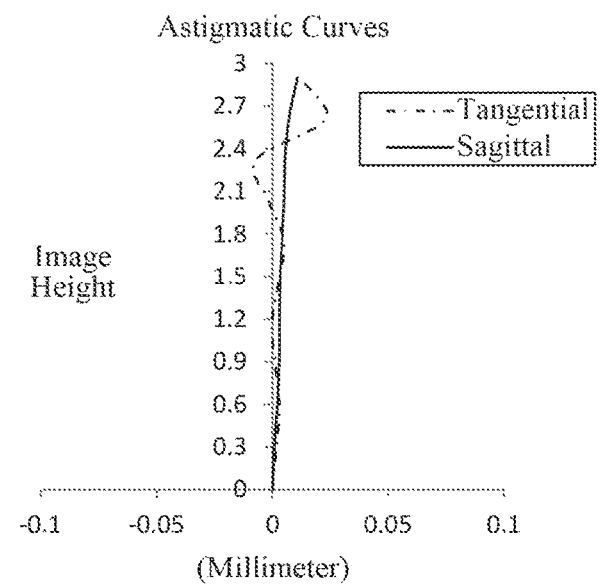
Figure 24C:
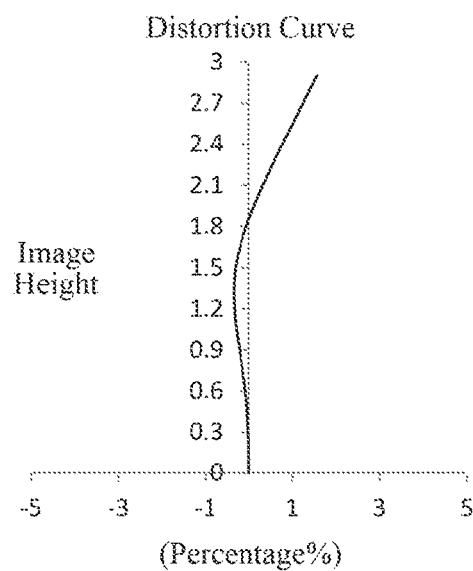
Figure 24D:
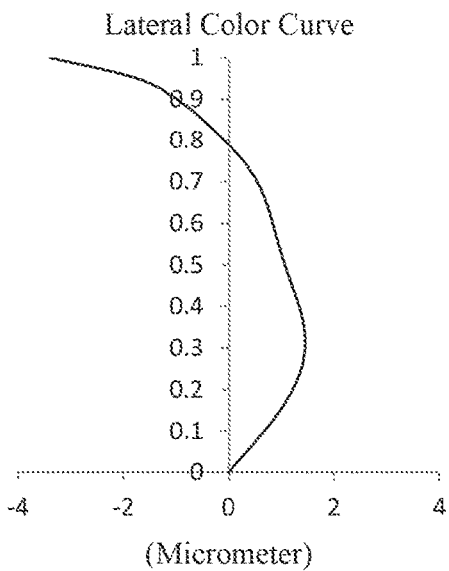

FIGS. 22A, 23A, and 24A show longitudinal aberration curves when the zoom lens assembly of example 4 is in the wide-angle state, the intermediate state, and the telephoto state, respectively, representing the deviations of focal points converged by light of different wavelengths after passing through the lens assembly. FIGS. 22B, 23B, and 24B show astigmatic curves when the zoom lens assembly of example 4 is in the wide-angle state, the intermediate state, and the telephoto state, respectively, representing the curvatures of a tangential plane and the curvatures of a sagittal plane. FIGS. 22C, 23C, and 24C show a distortion curve when the zoom lens assembly of example 4 is in the wide-angle state, the intermediate state, and the telephoto state, respectively, representing the amounts of distortion corresponding to different image heights. FIGS. 22D, 23D, and 24D show a lateral color curve when the zoom lens assembly of example 4 is in the wide-angle state, the intermediate state, and the telephoto state, respectively, representing the deviations of different image heights on an imaging plane after light passes through the lens assembly. As can be seen from FIGS. 22A to 24D, the zoom lens assembly according to example 4 can achieve good imaging quality in each state.

Example 5

Figure 25:
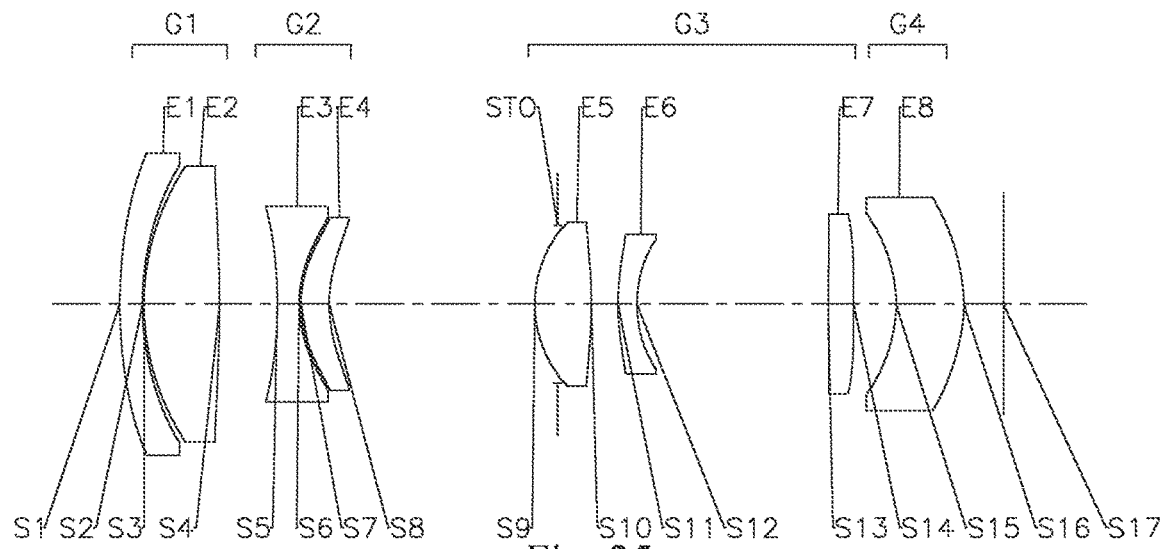
FIG. 25 shows a schematic structural view of a zoom lens assembly in a wide-angle state according to example 5 of the present disclosure.
Figure 26:
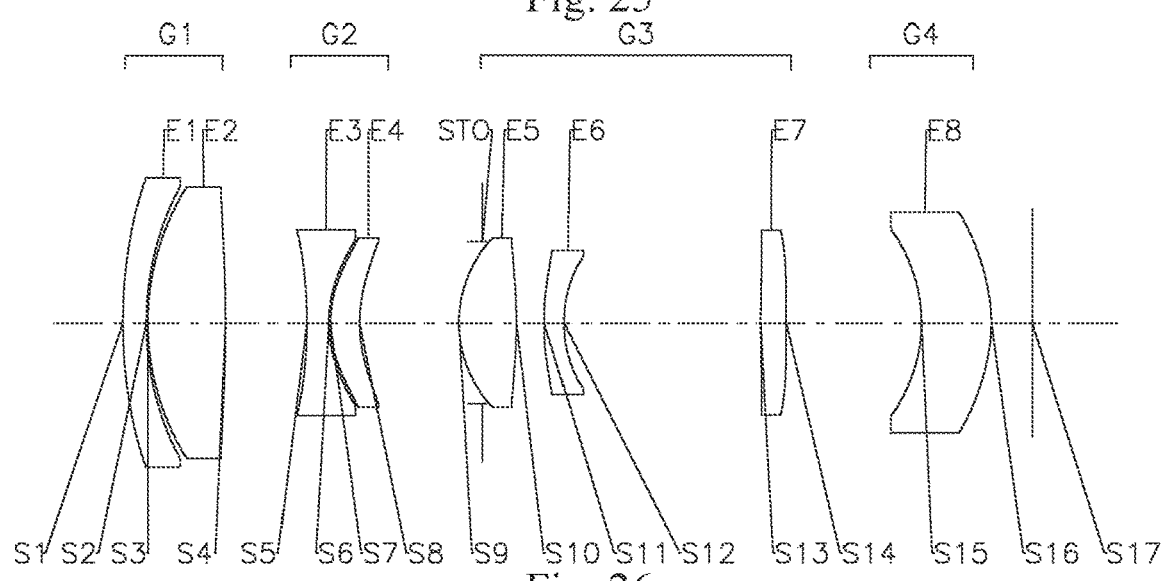
FIG. 26 shows a schematic structural view of a zoom lens assembly in an intermediate state during a transition from a wide-angle state to a telephoto state according to example 5 of the present disclosure.
Figure 27:
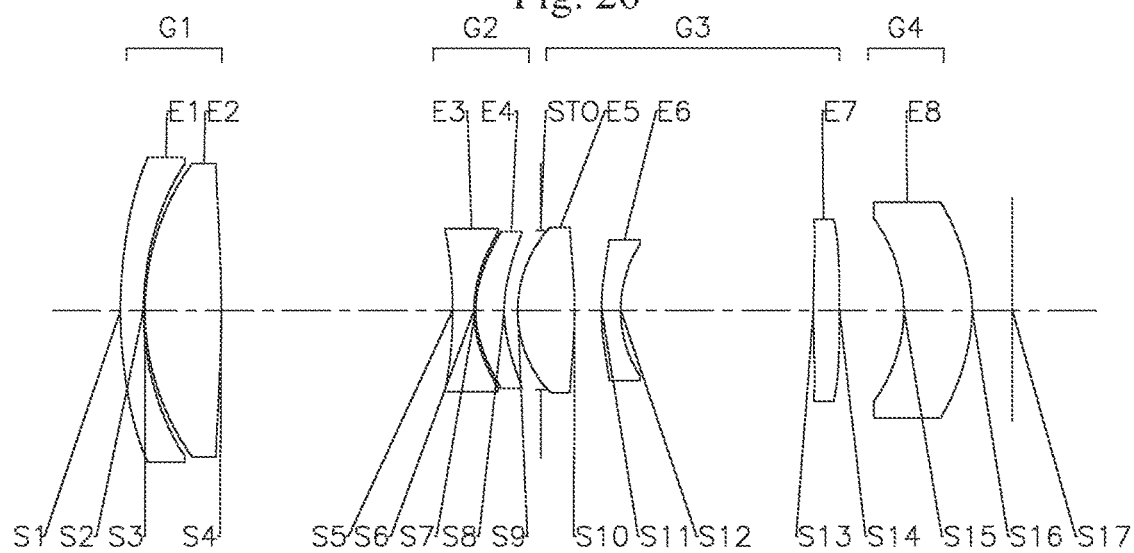
FIG. 27 shows a schematic structural view of a zoom lens assembly in a telephoto state according to example 5 of the present disclosure.

A zoom lens assembly according to example 5 of the present disclosure is described below with reference to FIGS. 25 to 30D. FIG. 25 shows a schematic structure view of a zoom lens assembly in a wide-angle state according to example 5 of the present disclosure. FIG. 26 shows a schematic structural view of a zoom lens assembly in an intermediate state during a transition from a wide-angle state to a telephoto state according to example 5 of the present disclosure. FIG. 27 shows a schematic structural view of a zoom lens assembly in a telephoto state according to example 5 of the present disclosure.

As shown in FIGS. 25 to 27, the zoom lens assembly sequentially from an object side to an imaging side includes a first lens group G1 (a first lens E1, and a second lens E2), a second lens group G2 (a third lens E3, and a fourth lens E4), a stop STO, a third lens group G3 (a fifth lens E5, a sixth lens E6, and a seventh lens E7), a fourth lens group G4 (an eighth lens E8), and an imaging plane S17.

The first lens E1 has negative refractive power, an object-side surface S1 thereof is convex, and an image-side surface S2 thereof is concave. The second lens E2 has positive refractive power, an object-side surface S3 thereof is convex, and an image-side surface S4 thereof is convex. The third lens E3 has negative refractive power, an object-side surface S5 thereof is concave, and an image-side surface S6 thereof is concave. The fourth lens E4 has positive refractive power, an object-side surface S7 thereof is convex, and an image-side surface S8 thereof is concave. The fifth lens E5 has positive refractive power, an object-side surface S9 thereof is convex, and an image-side surface S10 thereof is convex. The sixth lens E6 has negative refractive power, an object-side surface S11 thereof is convex, and an image-side surface S12 thereof is concave. The seventh lens E7 has positive refractive power, an object-side surface S13 thereof is convex, and an image-side surface S14 thereof is convex. The eighth lens E8 has positive refractive power, an object-side surface S15 thereof is concave, and an image-side surface S16 thereof is convex. Light from an object sequentially passes through the respective surfaces S1 to S16 and is finally imaged on the imaging plane S17.

In this example, a total length TTL of the zoom lens assembly is 23.28 mm, and half of a diagonal length ImgH of an effective pixel area on the imaging plane S17 of the zoom lens assembly is 2.90 mm.

Table 13 is a table illustrating basic parameters of the zoom lens assembly of example 5, wherein the units for the radius of curvature, the thickness/distance and the focal length are millimeter (mm).

TABLE 13

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | Infinite | | | | |
| S1 | Spherical | 12.5888 | 0.6000 | 1.67 | 19.3 | −27.55 | 0.000 |
| S2 | Spherical | 7.3774 | 0.0400 | | | | 0.000 |
| S3 | Aspheric | 6.5091 | 1.9932 | 1.54 | 55.6 | 10.31 | 0.000 |
| S4 | Aspheric | −33.1508 | D1 | | | | 0.000 |
| S5 | Aspheric | −11.7330 | 0.5609 | 1.62 | 60.3 | −4.03 | 0.000 |
| S6 | Aspheric | 3.2514 | 0.0400 | | | | 0.000 |
| S7 | Aspheric | 2.8089 | 0.7499 | 1.67 | 19.3 | 13.40 | 0.000 |
| S8 | Aspheric | 3.6263 | D2 | | | | 0.000 |
| STO | Spherical | Infinite | −0.6020 | | | | |
| S9 | Aspheric | 3.0845 | 1.4755 | 1.55 | 64.5 | 4.52 | 0.000 |
| S10 | Aspheric | −11.1170 | 0.7049 | | | | 0.000 |
| S11 | Aspheric | 7.1858 | 0.5000 | 1.67 | 19.3 | −9.92 | 0.000 |
| S12 | Aspheric | 3.3774 | 5.0413 | | | | 0.000 |
| S13 | Aspheric | 25.5891 | 0.6589 | 1.67 | 19.3 | 36.54 | 0.000 |
| S14 | Aspheric | −791.2146 | D3 | | | | 0.000 |
| S15 | Aspheric | −3.6886 | 1.7874 | 1.54 | 55.6 | 173.88 | 0.000 |
| S16 | Aspheric | −4.1495 | 1.0566 | | | | 0.000 |
| S17 | Spherical | Infinite | −0.0066 | | | | |

In this example, by changing positions of the second lens group and the third lens group along the optical axis, continuous zooming of the zoom lens assembly may be achieved. In other words, by changing the spaced interval D1 between the first lens group and the second lens group along the optical axis (i.e., a spaced interval between the image-side surface of the second lens E2 and the object-side surface of the third lens E3 along the optical axis), the spaced interval D2 between the second lens group and the third lens group along the optical axis (i.e., a spaced interval between the image-side surface of the fourth lens E4 and the object-side surface of the fifth lens E5 along the optical axis), and the spaced interval D3 between the third lens group and the fourth lens group along the optical axis (i.e., a spaced interval between the image-side surface of the seventh lens E7 and the object-side surface of the eighth lens E8 along the optical axis), the zoom lens assembly is switched from a wide-angle state to a telephoto state or from a telephoto state to a wide-angle state. A total effective focal length f, a maximum field-of-view FOV, and an aperture value Fno of the zoom lens assembly vary as the zoom lens assembly switches from the wide-angle state to the telephoto state or from the telephoto state to the wide-angle state.

Table 14 is a table showing parameters corresponding to the different states of the zoom lens assembly of example 5, wherein units of f, D1, D2 and D3 are all millimeters (mm) and unit of FOV is degrees (°).

TABLE 14

|  | f | FOV | Fno | D1 | D2 | D3 |
|---|---|---|---|---|---|---|
| Wide-angle state | 9.70 | 35.0 | 3.25 | 1.5270 | 6.0302 | 1.1205 |
| Intermediate state | 15.41 | 21.7 | 3.96 | 2.0728 | 3.1505 | 3.4545 |
| Telephoto state | 24.50 | 13.2 | 3.42 | 6.0380 | 0.9520 | 1.6878 |

Table 15 shows high-order coefficients applicable to each aspheric surface in example 5, wherein the surface shape of each aspheric surface may be defined by the formula (1) given in the above example 1.

TABLE 15

| Surface number | A4 | A6 | A8 | A10 | A12 | A14 | A16 |
|---|---|---|---|---|---|---|---|
| S3 | 1.0191E−04 | −1.2696E−05 | 1.6127E−06 | 6.6288E−09 | −1.6183E−09 | 2.2878E−12 | 9.3413E−13 |
| S4 | −2.6433E−05 | −2.3731E−05 | 9.2904E−07 | 1.1607E−07 | −3.7129E−09 | 1.3806E−10 | −1.0341E−12 |
| S5 | −1.5203E−05 | −8.6391E−06 | −9.1531E−08 | −1.4332E−08 | 3.1433E−09 | 0.0000E+00 | 0.0000E+00 |
| S6 | 3.9325E−04 | 4.0064E−06 | 1.0615E−06 | −1.6641E−07 | 4.9938E−09 | 0.0000E+00 | 0.0000E+00 |
| S7 | 7.9683E−04 | −5.3010E−04 | 6.9987E−05 | −2.7403E−06 | 0.0000E+00 | 0.0000E+00 | 0.0000E+00 |
| S8 | −1.3975E−03 | −4.4509E−04 | −1.8717E−04 | 1.7009E−05 | 0.0000E+00 | 0.0000E+00 | 0.0000E+00 |
| S9 | −8.8446E−03 | −4.6804E−04 | −4.1106E−05 | −1.5884E−05 | −2.9841E−07 | 0.0000E+00 | 0.0000E+00 |
| S10 | −8.7452E−03 | −2.4473E−04 | 1.2734E−04 | −8.8297E−06 | −5.6298E−06 | 5.7185E−07 | 0.0000E+00 |
| S11 | −1.3418E−03 | −4.9762E−05 | 2.6234E−05 | −3.7716E−06 | 0.0000E+00 | 0.0000E+00 | 0.0000E+00 |
| S12 | 4.7291E−03 | −3.9577E−04 | 9.4942E−05 | −1.8280E−05 | 1.1548E−06 | 0.0000E+00 | 0.0000E+00 |
| S13 | 1.7817E−03 | −1.1975E−03 | 3.4082E−05 | −4.0404E−05 | 0.0000E+00 | 0.0000E+00 | 0.0000E+00 |
| S14 | 4.7159E−03 | 0.0000E+00 | 0.0000E+00 | 0.0000E+00 | 0.0000E+00 | 0.0000E+00 | 0.0000E+00 |
| S15 | −4.1176E−03 | 8.0216E−05 | 4.4351E−05 | −9.8940E−06 | 2.9197E−06 | −3.3944E−07 | 0.0000E+00 |
| S16 | −5.4096E−03 | 2.1691E−04 | −7.4661E−05 | 2.4273E−05 | −2.2751E−06 | 0.0000E+00 | 0.0000E+00 |

Figure 28A:
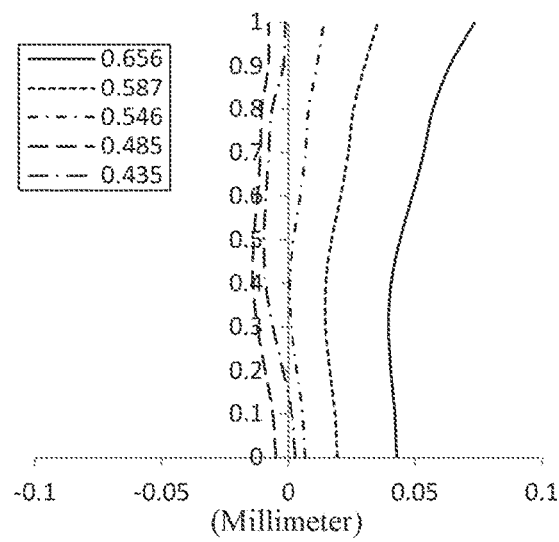
FIGS. 28A to 28D show longitudinal aberration curves, astigmatic curves, a distortion curve, and a lateral color curve, respectively, when the zoom lens assembly of example 5 is in a wide-angle state.
Figure 28B:
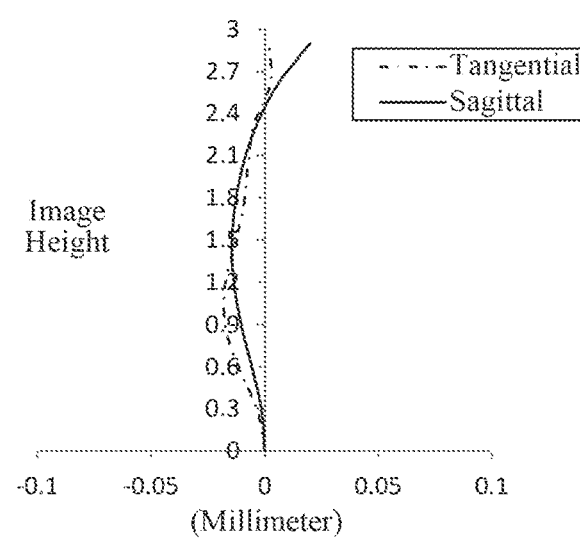
Figure 28C:
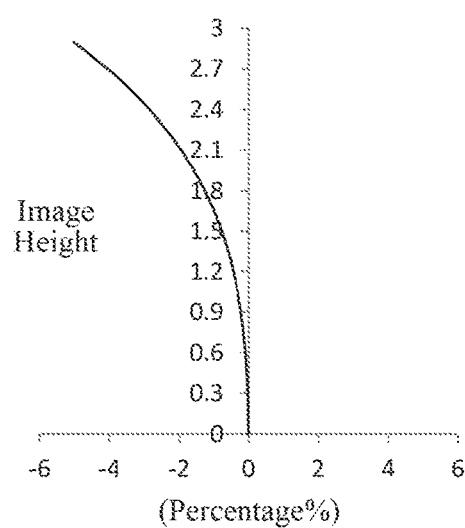
Figure 28D:
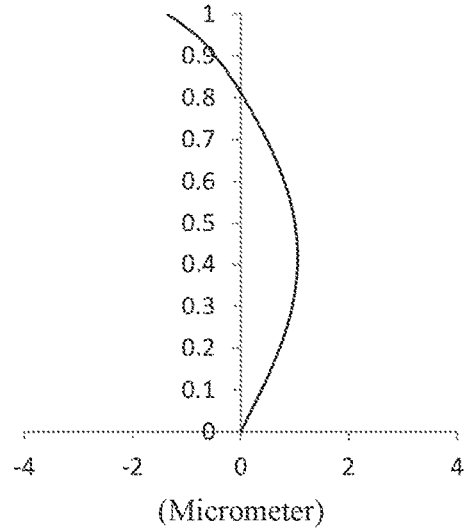
Figure 29A:
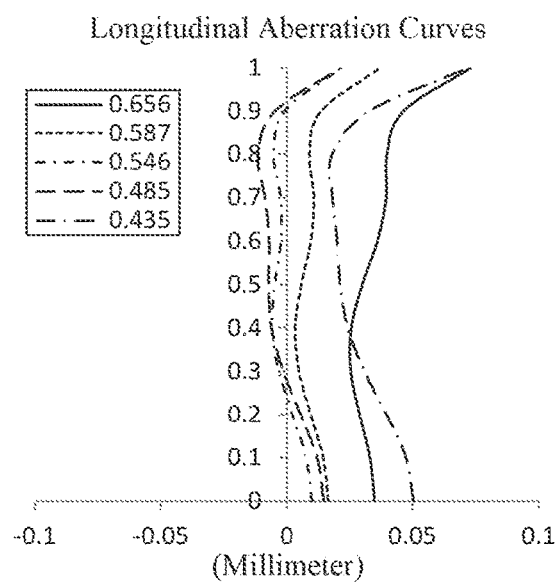
FIGS. 29A to 29D show longitudinal aberration curves, astigmatic curves, a distortion curve, and a lateral color curve, respectively, when the zoom lens assembly of example 5 is in an intermediate state during a transition from a wide-angle state to a telephoto state.
Figure 29B:
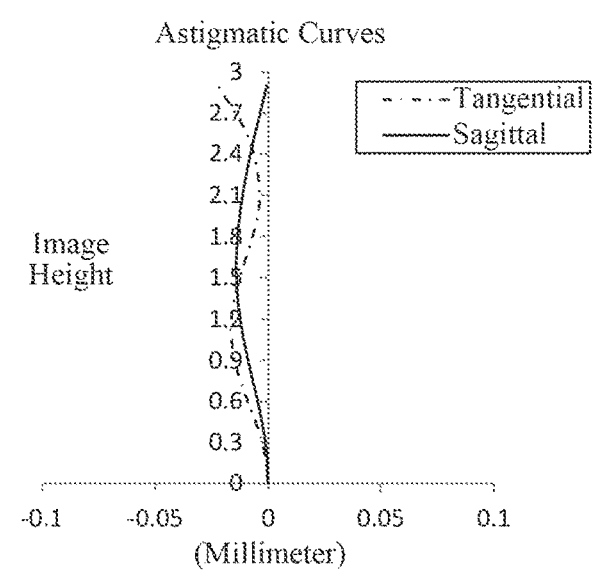
Figure 29C:
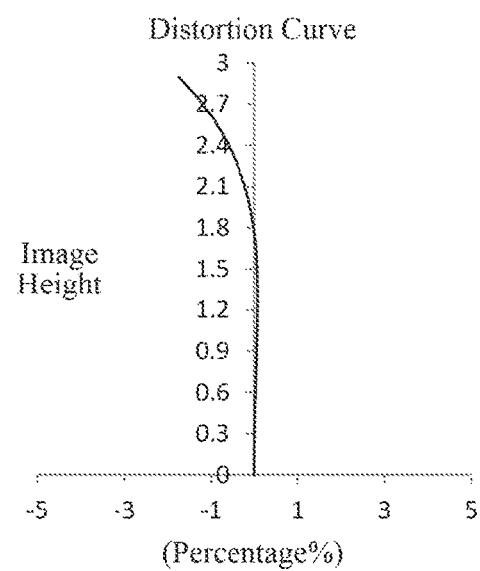
Figure 29D:
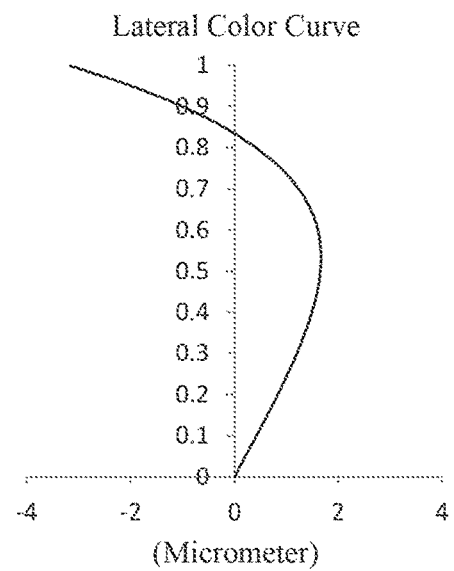
Figure 30A:
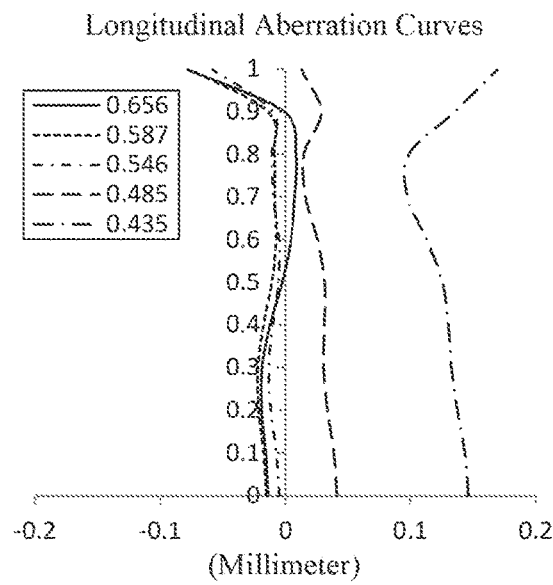
FIGS. 30A to 30D show longitudinal aberration curves, astigmatic curves, a distortion curve, and a lateral color curve, respectively, when the zoom lens assembly of example 5 is in a telephoto state.
Figure 30B:
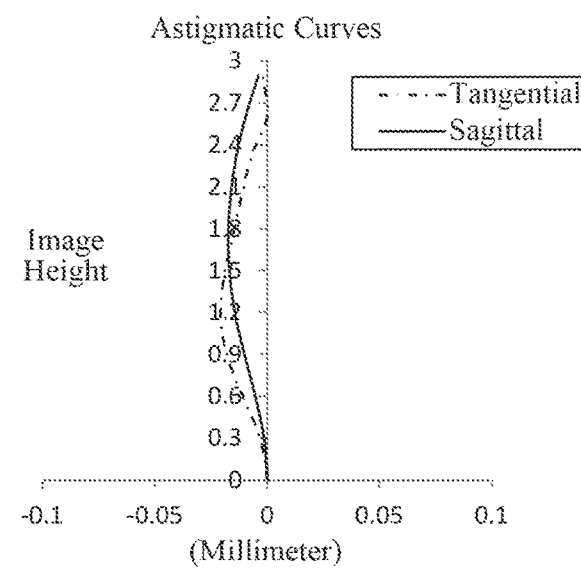
Figure 30C:
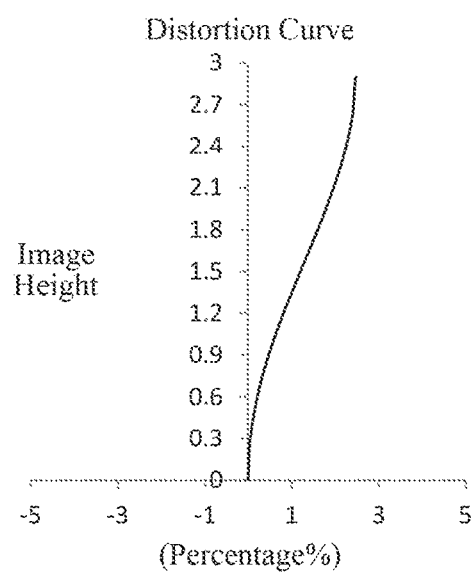
Figure 30D:
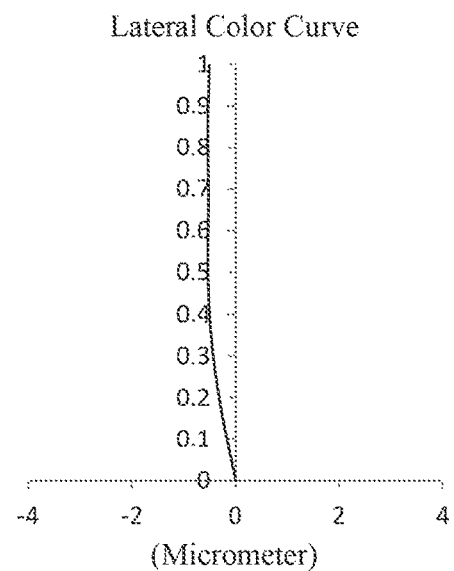

FIGS. 28A, 29A, and 30A show longitudinal aberration curves when the zoom lens assembly of example 5 is in the wide-angle state, the intermediate state, and the telephoto state, respectively, representing the deviations of focal points converged by light of different wavelengths after passing through the lens assembly. FIGS. 28B, 29B, and 30B show astigmatic curves when the zoom lens assembly of example 5 is in the wide-angle state, the intermediate state, and the telephoto state, respectively, representing the curvatures of a tangential plane and the curvatures of a sagittal plane. FIGS. 28C, 29C, and 30C show a distortion curve when the zoom lens assembly of example 5 is in the wide-angle state, the intermediate state, and the telephoto state, respectively, representing the amounts of distortion corresponding to different image heights. FIGS. 28D, 29D, and 30D show a lateral color curve when the zoom lens assembly of example 5 is in the wide-angle state, the intermediate state, and the telephoto state, respectively, representing the deviations of different image heights on an imaging plane after light passes through the lens assembly. As can be seen from FIGS. 28A to 30D, the zoom lens assembly according to example 5 can achieve good imaging quality in each state.

In view of the above, examples 1 to 5 respectively satisfy the relationship shown in Table 16.

TABLE 16

| Conditional/Example | 1 | 2 | 3 | 4 | 5 |
|---|---|---|---|---|---|
| ft/fw | 2.99 | 1.48 | 2.39 | 2.39 | 2.53 |
| TTL/fw | 3.26 | 2.61 | 2.33 | 2.10 | 2.40 |
| TTL/ft | 1.09 | 1.77 | 0.98 | 0.88 | 0.95 |
| F2/F3 | −0.79 | −0.81 | −0.89 | −1.13 | −0.83 |
| fw/F1 | 0.48 | 0.58 | 0.60 | 0.68 | 0.58 |
| |F4|/(|F4| + ft) | 0.77 | 0.73 | 0.53 | 0.37 | 0.88 |
| Tt12/Tw23 | 0.70 | 0.72 | 0.74 | 0.63 | 1.11 |
| Tw34/Tt34 | 0.69 | 0.71 | 0.70 | 0.38 | 0.66 |
| (f6-f5)/f1 | 0.42 | 0.45 | 0.52 | 0.42 | 0.52 |
| (R1 + R2)/(R3 − R4) | 0.80 | 0.56 | 0.74 | 0.62 | 0.50 |
| (R7 + R8)/(R9 − R10) | 1.01 | 0.88 | 0.71 | 0.92 | 0.45 |
| (CT2 + CT5)/ΣCT | 0.51 | 0.47 | 0.37 | 0.38 | 0.42 |

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device, such as a digital camera, or may be an imaging module integrated in a mobile electronic device, such as a mobile phone. The imaging apparatus is equipped with the zoom lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A zoom lens assembly, sequentially from an object side to an image side of the zoom lens assembly along an optical axis, comprising:
a first lens group having refractive power;
a second lens group having negative refractive power;
a third lens group having refractive power; and
a fourth lens group having refractive power,
wherein the zoom lens assembly includes no more than eight lenses, the no more than eight lenses including a first lens, a second lens, a third lens, a fourth lens, a fifth lens, a sixth lens, a seventh lens, and an eighth lens;

the first lens group comprises the first lens and the second lens sequentially arranged along the optical axis;

the second lens group comprises the third lens and the fourth lens sequentially arranged along the optical axis;

the third lens group comprises the fifth lens, the sixth lens, and the seventh lens sequentially arranged along the optical axis; and the fourth lens group comprises the eighth lens;

wherein the zoom lens assembly is configured to be continuously zoomed by changing positions of the second lens group and the third lens group along the optical axis, and $1.3 < ft/fw < 3.3$, where ft is a total effective focal length of the zoom lens assembly in a telephoto state, and fw is a total effective focal length of the zoom lens assembly in a wide-angle state.

2. The zoom lens assembly according to claim 1, wherein $-1.5 < F2/F3 < 0$, where F2 is an effective focal length of the second lens group, and F3 is an effective focal length of the third lens group.

3. The zoom lens assembly according to claim 1, wherein $0.3 < fw/F1 < 1.3$, where fw is the total effective focal length of the zoom lens assembly in the wide-angle state, and F1 is an effective focal length of the first lens group.

4. The zoom lens assembly according to claim 1, wherein $0.2 < |F4|/(|F4|+ft) < 1.0$, where F4 is an effective focal length of the fourth lens group, and ft is the total effective focal length of the zoom lens assembly in the telephoto state.

5. The zoom lens assembly according to claim 1, wherein $0.5 < Tt12/Tw23 < 1.5$, where Tt12 is a spaced interval along the optical axis between the first lens group and the second lens group of the zoom lens assembly in the telephoto state, and Tw23 is a spaced interval along the optical axis between the second lens group and the third lens group of the zoom lens assembly in the wide-angle state.

6. The zoom lens assembly according to claim 1, wherein $0.2 < Tw34/Tt34 < 1.0$, where Tt34 is a spaced interval between the third lens group and the fourth lens group along the optical axis of the zoom lens assembly in the telephoto state, and Tw34 is a spaced interval between the third lens group and the fourth lens group along the optical axis of the zoom lens assembly in the wide-angle state.

7. The zoom lens assembly according to claim 1, wherein $0.2 < (f6-f5)/f1 < 1.0$, where f1 is an effective focal length of the first lens, f5 is an effective focal length of the fifth lens, and f6 is an effective focal length of the sixth lens.

8. The zoom lens assembly according to claim 1, wherein $0.2 < (R1+R2)/(R3-R4) < 1.0$, where R1 is a radius of curvature of an object-side surface of the first lens, R2 is a radius of curvature of an image-side surface of the first lens, R3 is a radius of curvature of an object-side surface of the second lens, and R4 is a radius of curvature of an image-side surface of the second lens.

9. The zoom lens assembly according to claim 1, wherein $0.3 < (R7+R8)/(R9-R10) < 1.3$, where R7 is a radius of curvature of an object-side surface of the fourth lens, R8 is a radius of curvature of an image-side surface of the fourth lens, R9 is a radius of curvature of an object-side surface of the fifth lens, and R10 is a radius of curvature of an image-side surface of the fifth lens.

10. The zoom lens assembly according to claim 1, wherein $0.3 < (CT2+CT5)/\Sigma CT < 0.8$, where CT2 is a center thickness of the second lens along the optical axis, CT5 is a center thickness of the fifth lens along the optical axis, and $\Sigma CT$ is a sum of center thicknesses of the first lens to the eighth lens along the optical axis.

11. The zoom lens assembly according to claim 1, wherein $2.0 < TTL/fw < 3.5$, where TTL is a distance from an object-side surface of the first lens to an imaging plane of the zoom lens assembly along the optical axis, fw is the total effective focal length of the zoom lens assembly in the wide-angle state, and the first lens group is fixed during zooming.

12. The zoom lens assembly according to claim 1, wherein $0.8 < TTL/ft < 1.8$, where TTL is a distance from an object-side surface of the first lens to an imaging plane of the zoom lens assembly along the optical axis, ft is the total effective focal length of the zoom lens assembly in the telephoto state, and the first lens group is fixed during zooming.

13. A zoom lens assembly including no more than eight lenses, the no more than eight lenses including a first lens, a second lens, a third lens, a fourth lens, a fifth lens, a sixth lens, a seventh lens, and an eighth lens, and, sequentially from an object side to an image side of the zoom lens assembly along an optical axis, comprising:

a first lens group having refractive power which comprises the first lens and the second lens sequentially arranged along the optical axis;

a second lens group having negative refractive power which comprises the third lens and the fourth lens sequentially arranged along the optical axis;

a third lens group having refractive power which comprises the fifth lens, the sixth lens, and the seventh lens sequentially arranged along the optical axis; and a fourth lens group having refractive power which comprises the eighth lens, wherein the zoom lens assembly is configured to be continuously zoomed by changing positions of the second lens group and the third lens group along the optical axis, wherein $2.0 < TTL/fw < 3.5$, where TTL is a distance from an object-side surface of the first lens to an imaging plane of the zoom lens assembly along the optical axis, fw is a total effective focal length of the zoom lens assembly in a wide-angle state, and the first lens group is fixed during zooming.

14. The zoom lens assembly according to claim 13, wherein $-1.5 < F2/F3 < 0$, where F2 is an effective focal length of the second lens group, and F3 is an effective focal length of the third lens group.

15. The zoom lens assembly according to claim 13, wherein $0.3 < fw/F1 < 1.3$, where fw is a total effective focal length of the zoom lens assembly in a wide-angle state, and F1 is an effective focal length of the first lens group.

16. The zoom lens assembly according to claim 13, wherein $0.5 < Tt12/Tw23 < 1.5$, where Tt12 is a spaced interval along the optical axis between the first lens group and the second lens group of the zoom lens assembly in a telephoto state, and Tw23 is a spaced interval along the optical axis between the second lens group and the third lens group of the zoom lens assembly in a wide-angle state.

17. The zoom lens assembly according to claim 13, wherein $0.2 < Tw34/Tt34 < 1.0$,
where Tt34 is a spaced interval along the optical axis between the third lens group and the fourth lens group of the zoom lens assembly in a telephoto state, and Tw34 is a spaced interval along the optical axis between the third lens group and the fourth lens group of the zoom lens assembly in a wide-angle state.

18. The zoom lens assembly according to claim 13, wherein $0.8 < TTL/ft < 1.8$,
where TTL is a distance from an object-side surface of the first lens to an imaging plane of the zoom lens assembly along the optical axis, ft is a total effective focal length of the zoom lens assembly in a telephoto state, and the first lens group is fixed during zooming.

* * * * *